(12) United States Patent
Kim et al.

(10) Patent No.: US 12,003,549 B2
(45) Date of Patent: Jun. 4, 2024

(54) METHOD AND TERMINAL FOR PROCESSING SECURITY POLICY FOR V2X

(71) Applicant: LG Electronics Inc., Seoul (KR)

(72) Inventors: Dongjoo Kim, Seoul (KR); Sungduck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/957,155

(22) Filed: Sep. 30, 2022

(65) Prior Publication Data
US 2023/0042442 A1    Feb. 9, 2023

Related U.S. Application Data

(63) Continuation of application No. PCT/KR2020/014302, filed on Oct. 20, 2020.

(30) Foreign Application Priority Data

Mar. 31, 2020  (KR) .......................... 10-2020-0039178

(51) Int. Cl.
*H04L 9/40*        (2022.01)
(52) U.S. Cl.
CPC .......... *H04L 63/20* (2013.01); *H04L 63/0876* (2013.01); *H04L 63/102* (2013.01)
(58) Field of Classification Search
CPC ... H04L 63/20; H04L 63/0876; H04L 63/102; H04W 4/40; H04W 12/00; H04W 12/37; H04W 12/50; H04W 76/14; H04W 76/20; H04W 76/18; H04W 92/18
See application file for complete search history.

(56) References Cited

U.S. PATENT DOCUMENTS

| | | | |
|---|---|---|---|
| 9,621,407 B2 * | 4/2017 | Moganti | H04L 63/08 |
| 2016/0323353 A1 * | 11/2016 | Noldus | H04L 67/564 |
| 2019/0200228 A1 * | 6/2019 | Adrangi | H04L 9/3268 |
| 2019/0223008 A1 | 7/2019 | Vanderveen et al. | |

(Continued)

FOREIGN PATENT DOCUMENTS

| | | |
|---|---|---|
| KR | 102046159 | 11/2019 |
| WO | WO 2017074012 | 5/2017 |
| WO | WO 2019245783 | 12/2019 |

OTHER PUBLICATIONS

3GPP TS 33.536 V1.0.0 (2020-03), "3rd Generation Partnership Project; Technical Specification Group Services and System Aspects; Security aspects of 3GPP support for advanced Vehicle-to-Everything (V2X) services (Release 16)," 22 pages.

(Continued)

*Primary Examiner* — Khoi V Le
(74) *Attorney, Agent, or Firm* — Fish & Richardson P.C.

(57) ABSTRACT

A method for processing a security policy of a device may include a step for receiving, from another device, a first message including first information about a security policy of the other device. The first message may include a direct communication request message or a link modification request message. The method may further include the steps of: determining whether to accept or reject the first message on the basis of both the first information about the security policy of the other device and second information about the security policy of the device; and sending a second message on the basis of the determination.

19 Claims, 22 Drawing Sheets

(56) References Cited

U.S. PATENT DOCUMENTS

2021/0014198 A1\* 1/2021 Amoudi ............. H04L 63/0236
2022/0116784 A1\* 4/2022 Da Silva ............. H04W 12/037

OTHER PUBLICATIONS

Qualcomm Incorporated, "Proposed text for security establishment clause of NR PC5 unicast security," 3GPP TSG-SA3 Meeting #98e, S3-200347, e-meeting, Mar. 2-6, 2020, 4 pages.

Notice of Allowance in Korean Appln. No. 10-2022-7003992, dated Oct. 13, 2022, 5 pages (with English translation).

Qualcomm Incorporated & LG Electronics, "Security establishment for PC5 unicast link," C1-200349, Presented at 3GPP TSG-CT WG1 Meeting #122-e, Electronic meeting; Feb. 20-28, 2020, 21 pages.

\* cited by examiner

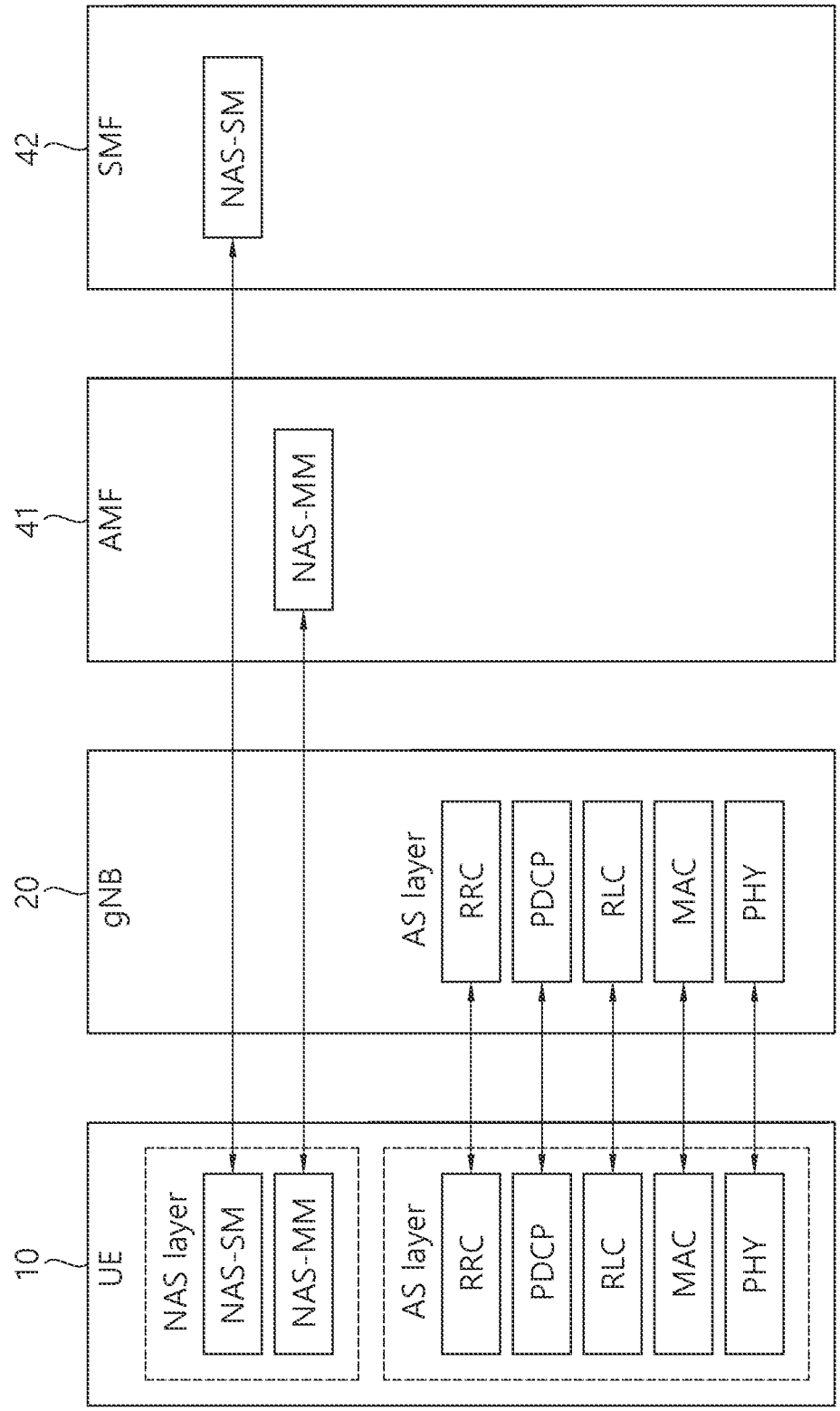

METHOD AND TERMINAL FOR PROCESSING SECURITY POLICY FOR V2X

CROSS-REFERENCE TO RELATED APPLICATIONS

Pursuant to 35 U.S.C. § 119(e), this application is a continuation of International Application PCT/KR2020/014302, with an international filing date of Oct. 20, 2020, which claims the benefit of Korean Patent Application No. 10-2020-0039178, filed on Mar. 31, 2020, the contents of which are hereby incorporated by reference herein in their entirety.

TECHNICAL FIELD

The present disclosure relates to mobile communication.

BACKGROUND

Thanks to the success of LTE (long term evolution)/LTE-Advanced (LTE-A) for 4th generation mobile communication, interest in next-generation, that is, 5th generation (so-called 5G) mobile communication is increasing, and research is being conducted one after another.

The 5th generation mobile communication defined by the International Telecommunication Union (ITU) refers to providing a data transmission rate of up to 20 Gbps and a perceived transmission speed of at least 100 Mbps anywhere. The official name is 'IMT-2020', and it aims to commercialize it worldwide in 2020.

5G mobile communication supports multiple numerology or subcarrier spacing (SCS) to support various services. For example, when SCS is 15 kHz, it supports a wide area in traditional cellular bands, when SCS is 30 kHz/60 kHz, it supports dense-urban, lower latency and wider carrier bandwidth, when SCS is 60 kHz or higher, it supports a bandwidth greater than 24.25 GHz to overcome phase noise.

The NR frequency band is defined as two types of frequency ranges (FR1, FR2). FR1 is 410 MHz-7125 MHz, and FR2 is 24250 MHz-52600 MHz, which may mean millimeter wave (mmW).

For convenience of explanation, among the frequency ranges used in the NR system, FR1 may mean "sub 6 GHz range" and FR2 may mean "above 6 GHz range" and may be called millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 4100 MHz to 7125 MHz as shown in Table A7 below. That is, FR1 may include a frequency band of 6 GHz (or 5850, 5900, 5925 MHz, etc.) or more. For example, a frequency band of 6 GHz (or 5850, 5900, 5925 MHz, etc.) or higher included in FR1 may include an unlicensed band. The unlicensed band may be used for various purposes, for example, for communication for a vehicle (eg, autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

The ITU proposes three usage scenarios, for example, enhanced Mobile BroadBand (eMBB), massive Machine Type Communication (mMTC) and Ultra Reliable and Low Latency Communications (URLLC).

First, URLLC relates to usage scenarios requiring high reliability and low latency. For example, services such as autonomous driving, factory automation, and augmented reality require high reliability and low latency (eg, latency of 1 ms or less). Currently, the delay time of 4G (LTE) is statistically 21-43 ms (best 10%) and 33-75 ms (median). This is insufficient to support services requiring latency of less than 1 ms.

Next, the eMBB usage scenario relates to a usage scenario requiring mobile ultra-wideband.

This ultra-wideband high-speed service seems difficult to be accommodated by the core network designed for the existing LTE/LTE-A.

Therefore, in the so-called 5G mobile communication, redesign of the core network is urgently required.

FIG. 1 is a structural diagram of a next-generation mobile communication network.

5GC (5G Core) may include various components, in FIG. 1, 5GC includes AMF (Access and Mobility Management Function) (41), SMF (Session Management Function) (42), PCF (Policy Control Function) (43), UPF (User Plane Function) (44), AF (Application Function) 45, UDM (Unified Data Management) 46, and N3IWF (Non-3GPP InterWorking Function) 49, which corresponding to some of the various components.

The UE 10 is connected to a data network via the UPF 44 via a Next Generation Radio Access Network (NG-RAN).

The UE 10 may be provided with a data service through untrusted non-3rd Generation Partnership Project (non-3GPP) access, for example, a Wireless Local Area Network (WLAN). In order to connect the non-3GPP access to the core network, an N3IWF 49 may be deployed.

FIG. 2 is an exemplary diagram illustrating a predicted structure of a next generation mobile communication in terms of a node.

Referring to FIG. 2, the UE is connected to a data network (DN) through a next generation RAN (Radio Access Network).

The Control Plane Function (CPF) node shown in FIG. 2 may perform all or part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

In FIG. 2, the UE may simultaneously access two data networks using multiple PDU sessions.

FIG. 3 illustrates an architecture that allows the UE to simultaneously access two data networks using one PDU session.

FIG. 3 illustrates an architecture that allows the UE to simultaneously access two data networks using one PDU session.

For reference, descriptions of the reference points shown in FIGS. 2 and 3 are as follows.

N1 represents Reference point between UE and AMF.
N2 represents Reference point between NG-RAN and AMF.
N3 represents Reference point between NG-RAN and UPF.
N4 represents Reference point between SMF and UPF.
N5 represents Reference point between PCF and AF.
N6 represents Reference point between UPF and DN.
N7 represents Reference point between SMF and PCF.
N8 represents Reference point between UDM and AMF.
N9 represents Reference point between UPFs.
N10 represents Reference point between UDM and SMF.
N11 represents Reference point between AMF and SMF.
N12 represents Reference point between AMF and AUSF.
N13 represents Reference point between UDM and AUSF.
N14 represents Reference point between AMFs.
N15 represents a reference point between PCF and AMF.
N16 represents a reference point between SMFs.
N22 represents a reference point between the AMF and the NSSF.

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.
  NAS procedures related to AMF include the following.
    Registration management and access management procedures. AMF supports the following functions.
    Secure NAS signal connection between UE and AMF (integrity protection, encryption)
  2) The NAS entity for SM performs session management between the UE and the SMF.
  The SM signaling message is processed, that is, generated and processed, at an NAS-SM layer of the UE and SMF. The contents of the SM signaling message are not interpreted by the AMF.
  In the case of SM signaling transmission,
    The NAS entity for the MM creates a NAS-MM message that derives how and where to deliver an SM signaling message through a security header representing the NAS transmission of SM signaling and additional information on a received NAS-MM.
    Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an access stratum (AS).

A network system (ie, 5GC) for next-generation mobile communication (ie, 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

Meanwhile, due to an increase in user requirements for a social network service (SNS), communication between UEs at a physically close distance, that is, device to device (D2D) communication is required.

A link between UEs used for D2D communication is also called a sidelink or a PC5 link. In preparation for this, the link with the existing base station is also called a Uu link.

When the security policy is different between the requesting UE (or the initiating UE) (eg, the first UE) and the receiving UE (eg, the second UE), a problem may occur.

SUMMARY

Accordingly, a disclosure of the present specification has been made in an effort to solve the aforementioned problem.

In order to solve the above problems, one disclosure of the present specification may provide a method of processing a security policy of a device. The method may include receiving, from the other device, a first message including first information about a security policy of the other device. The first message may include a direct communication request message or a link modification request message. The method includes determining whether to accept or reject the first message based on both first information about a security policy of the other device and second information about a security policy of the device; and transmitting a second message based on the determination.

In order to solve the above problems, one disclosure of the present specification may provide a chipset mounted on a device. The chipset includes at least one processor; and at least one memory to store instructions and operably electrically connectable to the at least one processor. Based on the instruction being executed by the at least one processor, the operation performed includes: receiving, from the other device, a first message including first information about a security policy of the other device. The first message may include a direct communication request message or a link modification request message. The method includes determining whether to accept or reject the first message based on both first information about a security policy of the other device and second information about a security policy of the device, and transmitting a second message based on the determination.

In order to solve the above problems, one disclosure of the present specification provides an apparatus. The apparatus includes: a transceiver; at least one processor; and at least one memory to store instructions and operably electrically connectable to the at least one processor. Based on the instruction being executed by the at least one processor, the operation performed includes: receiving, from the other device, a first message including first information about a security policy of the other device. The first message may include a direct communication request message or a link modification request message. The method includes determining whether to accept or reject the first message based on both first information about a security policy of the other device and second information about a security policy of the device; and transmitting a second message based on the determination.

In order to solve the above problems, one disclosure of the present specification may provide a non-volatile computer-readable storage medium in which instructions are recorded. The storage medium may include instructions. The instructions, when executed by one or more processors mounted on an apparatus, may cause the one or more processors to perform an operation. The operation includes: receiving, from the other device, a first message including first information about a security policy of the other device. The first message may include a direct communication request message or a link modification request message. The method includes determining whether to accept or reject the first message based on both first information about a security policy of the other device and second information about a security policy of the device; and transmitting a second message based on the determination.

According to the disclosure of the present specification, it is possible to solve the problems of the prior art.

BRIEF DESCRIPTION OF THE DRAWINGS

FIG. 4 is another exemplary diagram showing a structure of a radio interface protocol between a UE and a gNB.

DESCRIPTION OF EXEMPLARY EMBODIMENTS

Figure 1:
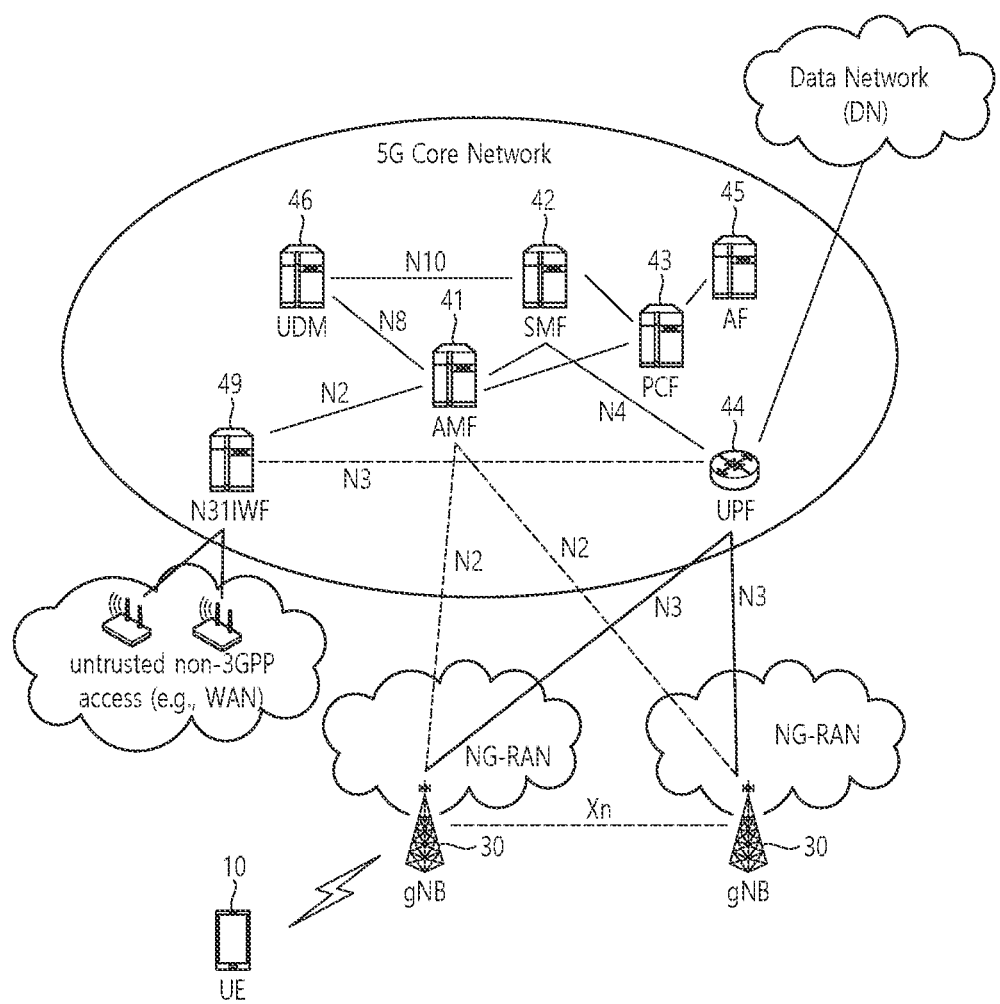
FIG. 1 is a structural diagram of a next-generation mobile communication network.
Figure 2:
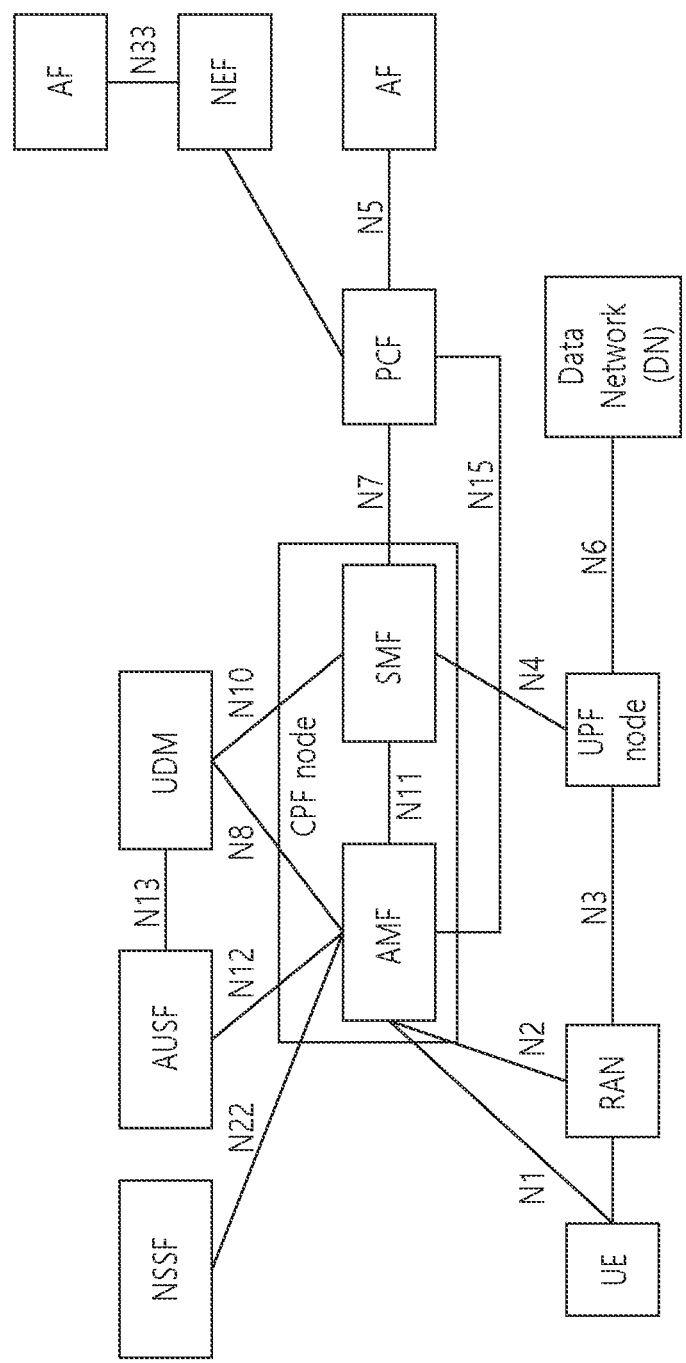
FIG. 2 is an exemplary diagram illustrating a predicted structure of a next generation mobile communication in terms of a node.
Figure 3:
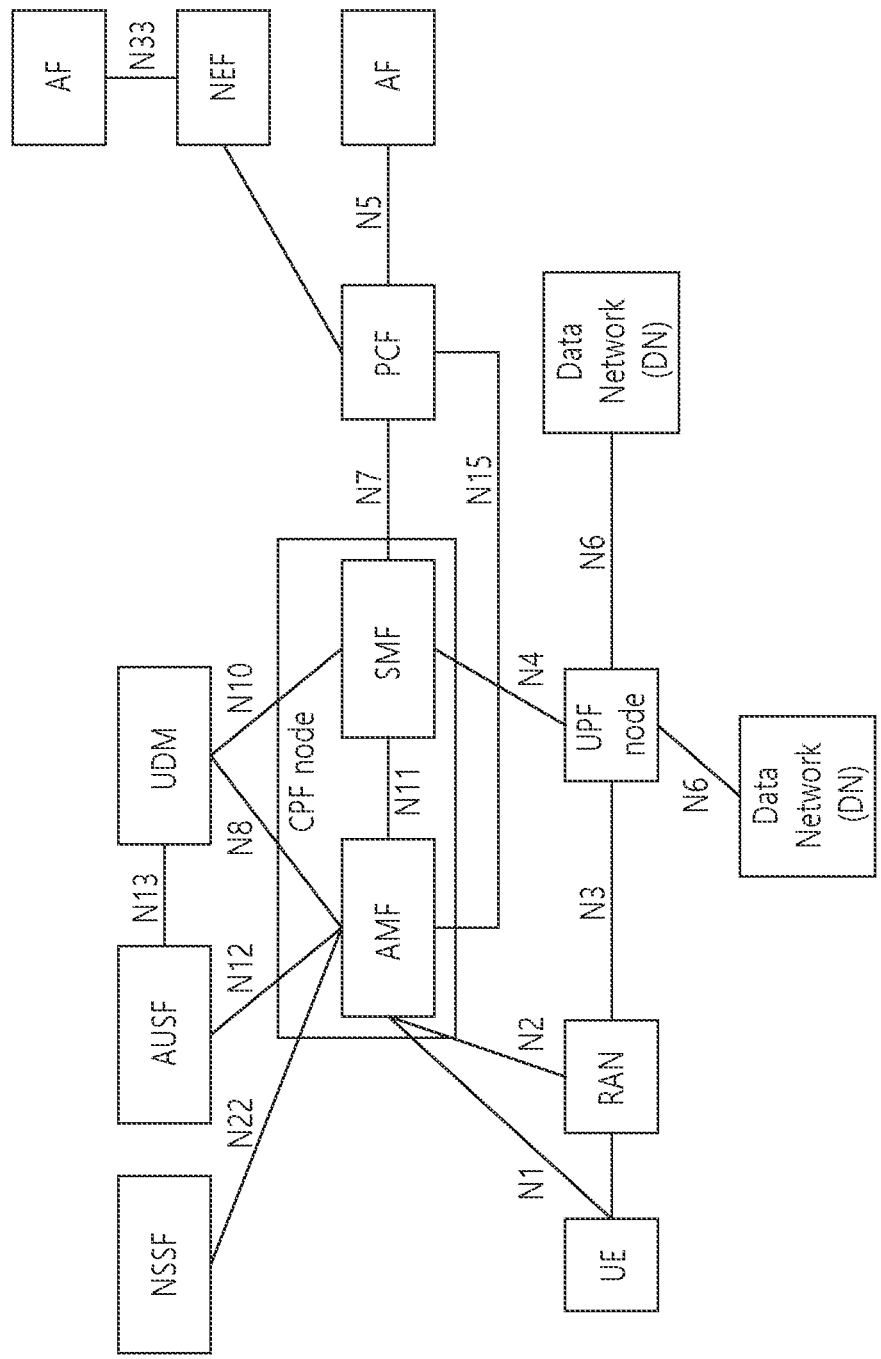
FIG. 3 illustrates an architecture that allows the UE to simultaneously access two data networks using one PDU session.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

In this specification, "A or B (A or B)" may mean "only A", "only B" or "both A and B". In other words, "A or B (A or B)" in this specification may be interpreted as "A and/or B (A and/or B)". For example, "A, B or C (A, B or C)" herein means "only A", "only B", "only C", or "any and any combination of A, B and C (any combination of A, B and C)".

As used herein, a slash (/) or a comma (comma) may mean "and/or (and/or)". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B" or "both A and B". Also, in this specification, the expression "at least one of A or B" or "at least one of A and/or B" can be interpreted the same as "at least one of A and/or B".

Also, as used herein, "at least one of A, B and C" means "only A", "only B", "only C", or "Any combination of A, B and C". Also, "at least one of A, B or C" or "at least one of A, B and/or C" means may mean "at least one of A, B and C".

In addition, parentheses used herein may mean "for example". Specifically, when displayed as "control information (PDCCH)", "PDCCH" may be proposed as an example of "control information". In other words, "control information" in the present specification is not limited to "PDCCH", and "PDCCH" may be proposed as an example of "control information". Also, even when displayed as "control information (ie, PDCCH)", "PDCCH" may be proposed as an example of "control information".

Technical features that are individually described in one drawing in this specification may be implemented individually or may be implemented at the same time.

In the accompanying drawings, user equipment (UE) is illustrated by way of example, but the illustrated UE may be referred to by terms such as UE 100 (Terminal), ME (Mobile Equipment), and the like. In addition, the UE may be a portable device such as a notebook computer, a mobile phone, a PDA, a smart phone, a multimedia device, or the like, or may be a non-portable device such as a PC or a vehicle-mounted device.

<PDU Session Establishment Procedure>

For the PDU (Protocol Data Unit) Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 5A:
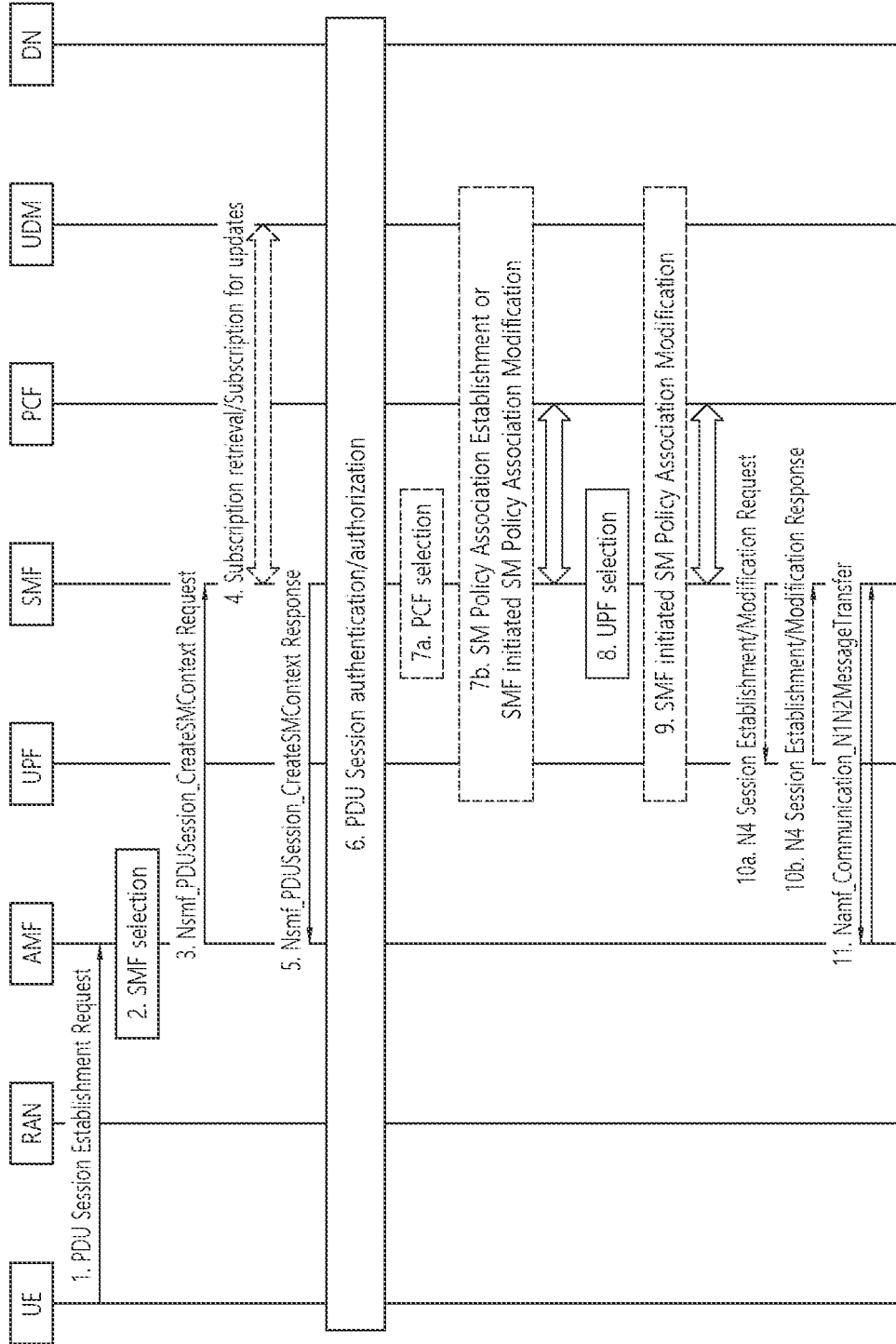
FIGS. 5A and 5B are a signal flowchart illustrating an exemplary PDU session establishment procedure.
Figure 5B:
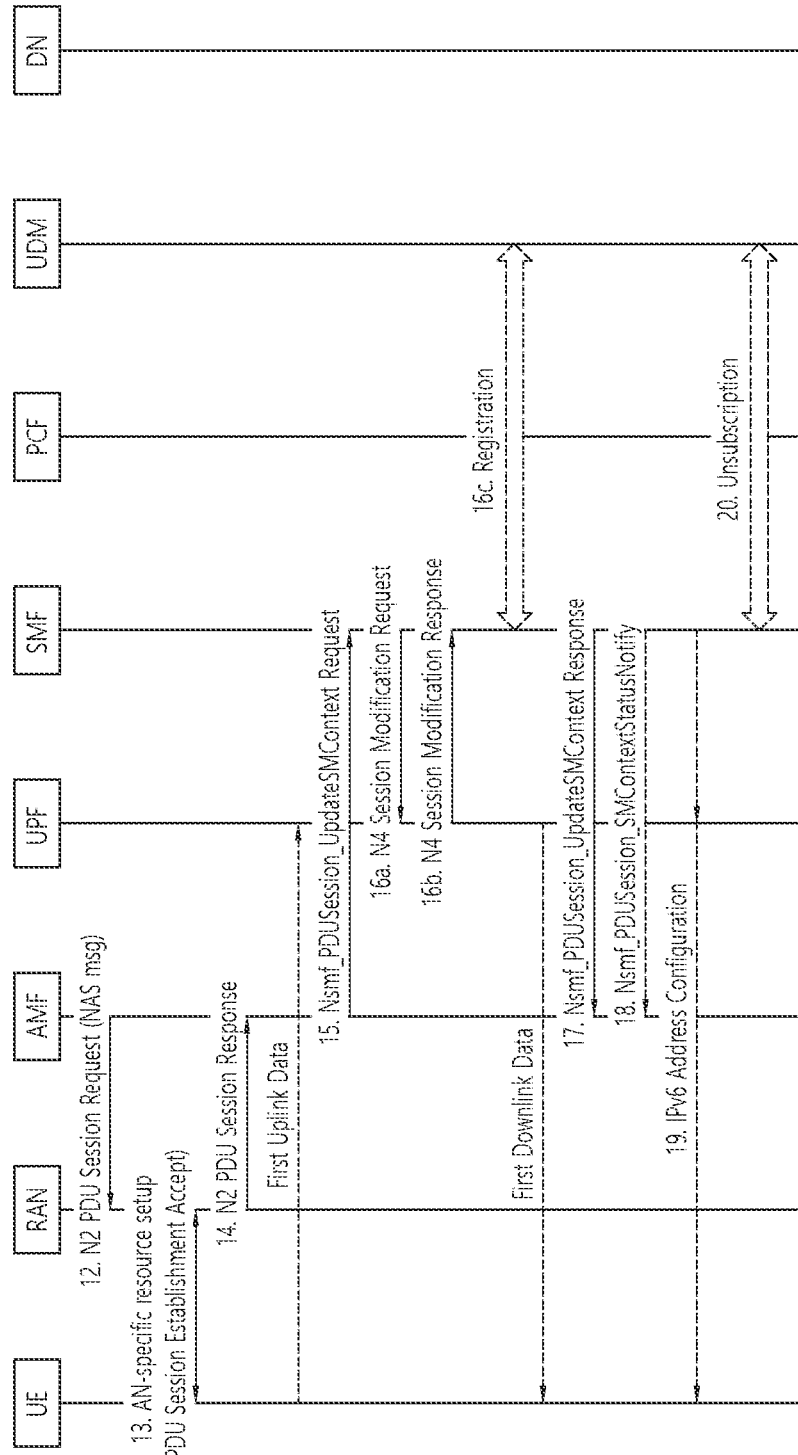

FIGS. 5A and 5B are a signal flowchart illustrating an exemplary PDU session establishment procedure.

The procedure shown in FIGS. 5A and 5B assumes that the UE has already registered on the AMF according to the registration procedure shown in FIG. 5. Therefore, it is assumed that the AMF has already acquired user subscription data from UDM.

1) The UE transmits a NAS message to the AMF. The message may include Single-Network Slice Selection Assistance Information (S-NSSAI), DNN (data network name), PDU session ID, a Request type, N1 SM information (including PDU Session Request), and so on.

Specifically, the UE includes the S-NSSAI from the allowed (allowed) NSSAI of the current access type. If information on the mapped NSSAI is provided to the UE, the UE may provide both the S-NSSAI based on the allowed NSSAI and the corresponding S-NSSAI based on the information of the mapped NSSAI. Here, the mapped NSSAI information is information that maps each S-NSSAI of the allowed NSSAI to the S-NASSI of the NSSAI configured for HPLMN (Home Public Land Mobile Network).

More specifically, The UE may extract and store the information of the allowed S-NSSAI and the mapped S-NSSAI included in the registration accept message received from the network (ie, AMF) in the registration procedure of FIG. 5. Accordingly, the UE may transmit the PDU session establishment request message by including both the S-NSSAI based on the allowed NSSAI and the corresponding S-NSSAI based on the mapped NSSAI information.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

The AMF may select SMF.

3) The AMF may transmit an Nsmf_PDUSession_CreateSMContext request message or an Nsmf_PDUSession_UpdateSMContext request message to the selected SMF.

The Nsmf_PDUSession_CreateSMContext request message may include SUPI, DNN, S-NSSAI(s), PDU Session ID, AMF ID, Request Type, PCF ID, Priority Access, N1 SM container, User location information, Access Type, PEI, GPSI, UE presence in LADN service area, Subscription For PDU Session Status Notification, DNN Selection Mode, Trace Requirements. The SM container may include PDU Session Establishment request message.

The Nsmf_PDUSession_UpdateSMContext request message may include SUPI, DNN, S-NSSAI(s), SM Context ID, AMF ID, Request Type, N1 SM container, User location information, Access Type, RAT type, PEI. The N1 SM container may include PDU Session Establishment request message.

The AMF ID is used to identify the AMF serving the UE. The N1 SM information may include a PDU session establishment request message received from the UE.

4) SMF transmits subscriber data request message to UDM. The subscriber data request message may include a subscriber permanent ID and DNN. UDM may transmit subscription data response message to SMF In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) SMF transmits Nsmf_PDUSession_CreateSMContext Response message or Nsmf_PDUSession_UpdateSMContext Response message to AMF.

The Nsmf_PDUSession_CreateSMContext Response message may include Cause, SM Context ID, or N1 SM container. The N1 SM container may include a PDU Session Reject.

In step 3 above, when the SMF has received the Nsmf_PDUSession_CreateSMContext request message and the SMF can process the PDU Session establishment request message, the SMF SM context is created and the SM context ID is delivered to the AMF.

6) Secondary authentication/authorization is optionally performed.

7a) If the operating (working) PCC is used for the PDU session, the SMF selects the PCF.

7b) The SMF performs an SM policy association establishment procedure in order to establish an SM policy association with the PCF.

8) If the request type in step 3 indicates "initial request", the SMF selects the SSC mode for the PDU session. If step 5 is not performed, SMF can also select UPF. In case of the request type IPv4 or IPv6, the SMF may allocate an IP address/prefix for the PDU session.

9) The SMF provides information on the policy control request trigger condition by performing the SM policy association modification procedure.

10) If the request type indicates "initial request", the SMF may start the N4 session establishment procedure using the selected UPF, otherwise it may start the N4 session modification procedure using the selected UPF.

10a) SMF sends N4 session establishment/modification request message to UPF. In addition, the SMF may provide packet detection, enforcement and reporting rules to be installed in the UPF for the PDU session. When the SMF allocates CN tunnel information, the CN tunnel information may be provided to the UPF.

10b) The UPF may respond by sending an N4 session establishment/modification response message. When the CN tunnel information is allocated by the UPF, the CN tunnel information may be provided to the SMF.

11) The SMF transmits the Namf_Communication_N1N2MessageTransfer message to the AMF. The Namf_Communication_N1N2MessageTransfer message may include a PDU Session ID, N2 SM information, and N1 SM container.

The N2 SM information may include PDU Session ID, QFI (QoS Flow ID), QoS Profile(s), CN Tunnel Info, S-NSSAI from the Allowed NSSAI, Session-AMBR, PDU Session Type, User Plane Security Enforcement information, UE Integrity Protection Maximum Data Rate.

The N1 SM container may include a PDU session establishment acceptance message.

The PDU session establishment acceptance message may include an allowed QoS rule, SSC mode, S-NSSAI, and an assigned IPv4 address.

12) AMF transmits an N2 PDU session request message to the RAN. The message may include N2 SM information and a NAS message. The NAS message may include a PDU session ID and a PDU session establishment acceptance message.

The AMF may transmit a NAS message including a PDU session ID and a PDU session establishment accept message. In addition, the AMF transmits the received N2 SM information from the SMF to the RAN by including it in the N2 PDU session request message.

13) The RAN may perform a specific signaling exchange with the UE related to the information received from the SMF.

The RAN also allocates RAN N3 tunnel information for the PDU session.

The RAN delivers the NAS message provided in step 10 to the UE. The NAS message may include a PDU session ID and N1 SM information. The N1 SM information may include a PDU session establishment acceptance message.

The RAN sends the NAS message to the UE only when the necessary RAN resources are established and the allocation of RAN tunnel information is successful.

14) The RAN transmits an N2 PDU session response message to the AMF. The message may include a PDU session ID, cause, and N2 SM information. The N2 SM information may include a PDU session ID, (AN) tunnel information, and a list of allowed/rejected QoS profiles.

The RAN tunnel information may correspond to the access network address of the N3 tunnel corresponding to the PDU session.

15) The AMF may transmit the Nsmf_PDUSession_UpdateSMContext request message to the SMF. The Nsmf_PDUSession_UpdateSMContext request message may include N2 SM information. Here, the AMF may transfer the N2 SM information received from the RAN to the SMF.

16a) If the N4 session for the PDU session is not already established, the SMF may start the N4 session establishment procedure together with the UPF. Otherwise, the SMF may use the UPF to initiate the N4 session modification procedure. The SMF may provide AN tunnel information and CN tunnel information. The CN tunnel information may be provided only when the SMF selects the CN tunnel information in step 8.

16b) The UPF may transmit an N4 session modification response message to the SMF.

17) The SMF transmits an Nsmf_PDUSession_UpdateSMContext Response message to the AMF.

After this process, the AMF can deliver the related event to the SMF.

18) The SMF transmits an Nsmf_PDUSession_SMContextStatusNotify message.

19) SMF transmits information to UE through UPF. Specifically, in the case of PDU Type IPv6, the SMF may generate an IPv6 Router Advertisement and transmit it to the UE through N4 and UPF.

20) If PDU session establishment is not successful during the procedure, the SMF notifies the AMF.

Figure 6A:
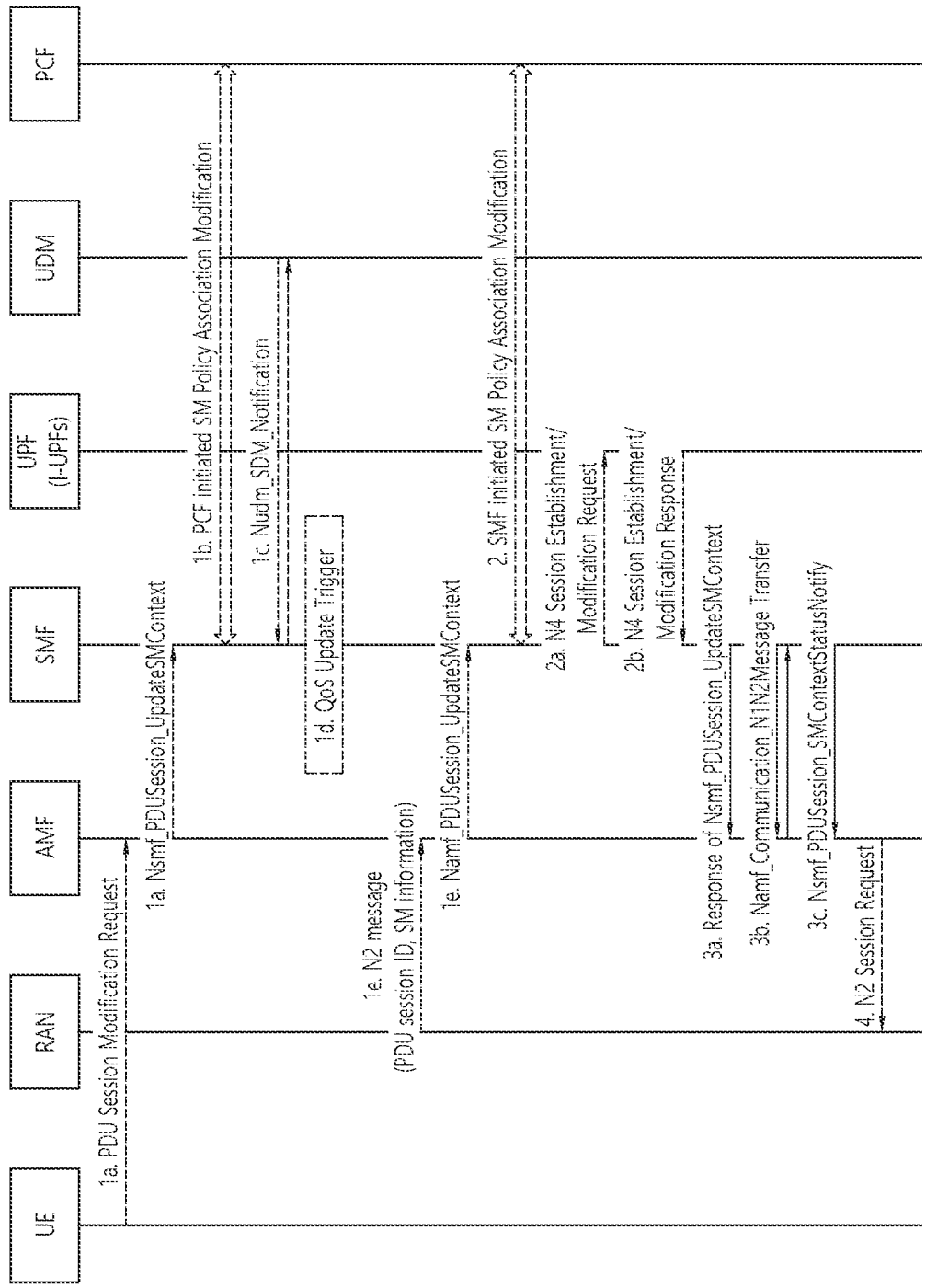
FIGS. 6A and 6B show a PDU session modification procedure.
Figure 6B:
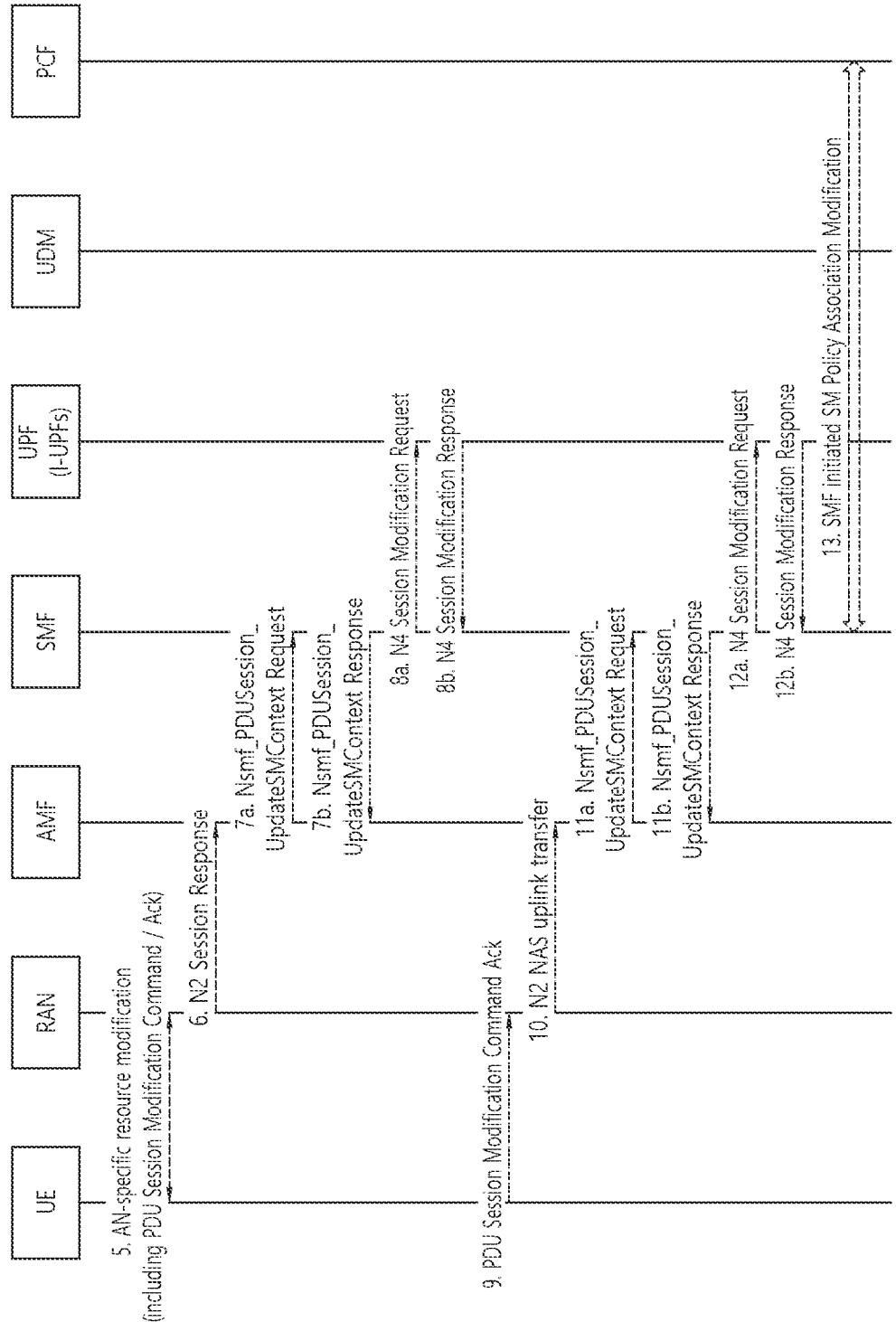

FIGS. 6A and 6B show a PDU session modification procedure.

The MA PDU session may be established/managed based on the PDU session modification procedure.

The PDU session modification procedure may be initiated by the UE or may be initiated by the network.

1a) When the UE initiates, the UE may initiate a PDU session modification procedure by sending a NAS message. The NAS message may include an N1 SM container. The N1 SM container may include a PDU session modification request message, a PDU session ID, and information on the maximum data rate for integrity protection of the UE. The PDU session modification request message may include a PDU session ID, packet filters, information on requested QoS, 5GSM core network capabilities, and the number of packet filters. The maximum data rate for integrity protection of the UE indicates the maximum data rate at which the UE can support UP integrity protection. The number of packet filters indicates the number of packet filters supported for QoS rules.

The NAS message is transmitted to an appropriate AMF according to the location information of the UE via the RAN. Then, the AMF transmits an Nsmf_PDUSession_UpdateSMContext message to the SMF. The message may include a session management (SM) context ID and an N1 SM container. The N1 SM container may include a PDU session modification request message.

1b) When initiated by the PCF among network nodes, the PCF may inform the SMF of the policy change by initiating an SM policy association modification procedure.

1c) When initiated by the UDM among the network nodes, the UDM may update the subscription data of the SMF by transmitting a Nudm_SDM_Notification message. The SMF may update the session management subscriber data and transmit an ACK message to the UDM.

1d) If initiated by SMF among network nodes, SMF may trigger QoS update.

When triggered according to 1a to 1d above, the SMF may perform a PDU session modification procedure.

1e) When initiated by an AN among network nodes, the AN may notify the SMF when an AN resource to which a QoS flow is mapped is released. The AN may transmit an N2 message to the AMF. The N2 message may include a PDU session ID and N2 SM information. The N2 SM information may include a QFI (QoS flow ID), user location information, and an indication indicating that the QoS flow is released. The AMF may transmit an Nsmf_PDUSession_UpdateSMContext message. The message may include SM context ID and N2 SM information.

2) The SMF may transmit a report on the subscription event by performing the SM policy alliance modification procedure. If the PDU session modification procedure is triggered by 1b or 1d, this step may be skipped. If a dynamic PCC is not deployed in the network, the SMF may apply an internal policy to determine the change of the QoS profile.

Steps 3 to 7 to be described later may not be performed when the PDU session modification requires only the UPF operation.

3a) When initiated by the UE or AN, the SMF may respond to the AMF by sending an Nsmf_PDUSession_UpdateSMContext message. The message may include N2 SM information and an N2 SM container. The N2 SM information may include a PDU session ID, QFI, QoS profile, and session-AMBR. The N1 SM container may include a PDU session modification command. The PDU session modification command may include a PDU session ID, a QoS rule, a QuS rule operation, a QoS parameter per QoS flow, and a session-AMBR.

The N2 SM information may include information to be transmitted by the AMF to the AN. The N2 SM information may include a QFI and a QoS profile to notify the AN that one or more QoS flows are added or modified. If the PDU session modification is requested by the UE for which the user plane resource is not configured, the N2 SM information to be delivered to the AN may include information on the establishment of the user plane resource.

The N1 SM container may include a PDU session modification command to be delivered by the AMF to the UE. The PDU session modification command may include QoS rules and QoS flow level QoS parameters.

3b) When initiated by the SMF, the SMF may transmit a Namf_Communication_N1N2MessageTransfer message. The message may include N2 SM information and N1 SM container. The N2 SM information may include a PDU session ID, QFI, QoS profile, and session-AMBR. The N1 SM container may include a PDU session modification command. The PDU session modification command may include a PDU session ID, a QoS rule, and a QoS flow level QoS parameter.

If the UE is in the CM-IDLE state and ATC is activated, the AMF updates and stores the UE context based on the Namf_Communication_N1N2MessageTransfer message, steps 3 to 7, which will be described later, may be skipped. When the UE enters the reachable state, that is, the UE enters the CM-CONNECTED state, the AMF may transmit an N1 message to synchronize the UE and the UE context.

4) The AMF may transmit an N2 PDU session request message to the AN. The N2 PDU session request message may include N2 SM information received from the SMF and a NAS message. The NAS message may include a PDU session ID and an N1 SM container. The N1 SM container may include a PDU session modification command.

5) The AN performs AN signaling exchange with the UE related to the information received from the SMF. For example, in the case of NG-RAN, in order to modify the necessary AN resources related to the PDU session, an RRC connection reconfiguration procedure with the UE may be performed.

6) The AN transmits an N2 PDU session ACK message in response to the received N2 PDU session request. The N2 PDU session ACK message may include N2 SM information and user location information. The N2 SM information may include a list of accepted/rejected QFIs, AN tunnel information, and a PDU session ID.

7) The AMF delivers the N2 SM information and user location information received from the AN to the SMF through the Nsmf_PDUSession_UpdateSMContext message. Then, the SMF delivers the Nsmf_PDUSession_UpdateSMContext message to the AMF.

8) The SMF transmits an N4 session modification request message to the UPF to update the N4 session of the UPF included in the PDU session modification.

When a new QoS flow is generated, the SMF updates the UL packet detection rule of the new QoS flow together with the UPF.

9) The UE transmits a NAS message in response to receiving the PDU session modification command. The NAS message may include a PDU session ID and an N1 SM container. The N1 SM container may include a PDU session modification command ACK.

10) The AN transmits the NAS message to the AMF.

11) The AMF may deliver the N1 SM container and user location information received from the AN to the SMF through an Nsmf_PDUSession_UpdateSMContext message. The N1 SM container may include a PDU session modification command ACK. The SMF may deliver an Nsmf_PDUSession_UpdateSMContext response message to the AMF.

12) The SMF transmits an N4 session modification request message to the UPF to update the N4 session of the UPF included in the PDU session modification. The message may include an N4 session ID.

13) When the SMF interacts with the PCF in step 1*b* or step 2 above, the SMF may inform the PCF whether or not the PCC decision can be performed through the SM policy alliance modification procedure.

The SMF may notify the requesting entity for user location information related to the change of the PDU session.

<D2D (Device to Device) Communication>

On the other hand, D2D communication will be described below.

Figure 7:
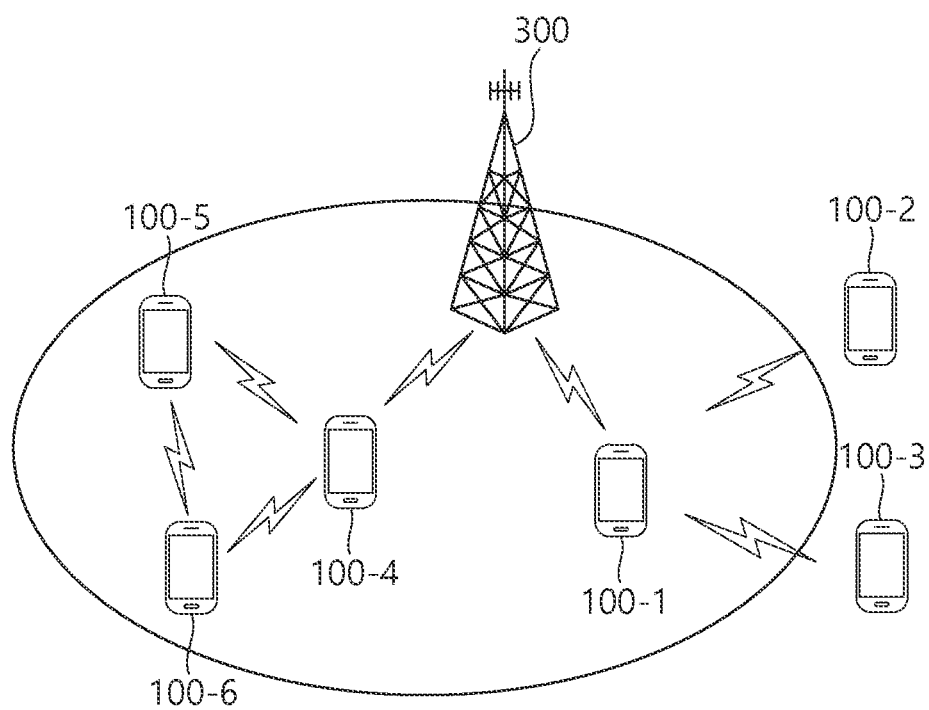
FIG. 7 shows the concept of D2D (Device to Device) communication.

FIG. 7 shows the concept of D2D (Device to Device) communication.

Due to an increase in user requirements fora social network service (SNS), communication between UEs at a physically close distance, that is, device to device (D2D) communication, is required. In addition, in the case of UEs used for public safety (Public Safety), D2D (Device to Device) communication may be used.

Figure 8:
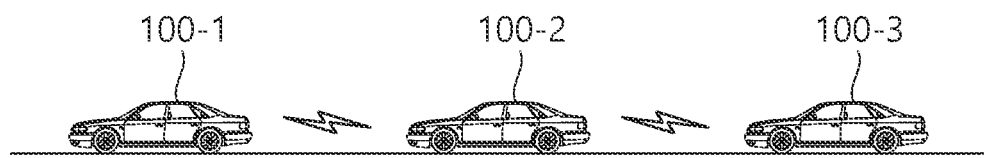
FIG. 8 is an exemplary diagram illustrating the concept of V2X.

In order to reflect the above requirements, as shown in FIG. 8, A method for directly communicating between UE #1(100-1), UE #2(100-2), UE #3(100-3) or UE #4(100-4), UE #5(100-5), UE #6(100-6), without the intervention of the base station (gNB) 300 is being discussed. Of course, it is possible to communicate directly between the UE #1 100-1 and the UE #4 100-4 with the help of the base station (gNB) 300. Meanwhile, UE #4 (100-4) may serve as a relay for UE #5 (100-5) and UE #6 (100-6). Similarly, UE #1100-1 may serve as a repeater for UE #2100-2 and UE #3100-3 that are far away from the cell center.

On the other hand, D2D communication is also called a proximity service (Proximity Service: ProSe). In addition, a UE performing a proximity service is also referred to as a ProSe UE. A link between UEs used for the D2D communication is also called a sidelink.

The physical channels used for the sidelink include the following.

PSSCH (Physical Sidelink Shared Channel)
PSCCH (Physical Sidelink Control Channel)
PSDCH (Physical Sidelink Discovery Channel)
PSBCH (Physical Sidelink Broadcast Channel)

In addition, there are the following physical signals used in the side link.

Demodulation Reference signal: DMRS
Sidelink Synchronization signal: SLSS

The SLSS includes a primary sidelink synchronization signal (PSLSS) and a secondary sidelink synchronization signal (Secondary SLSS: SSLSS).

<V2X (Vehicle-To-Everything)>

As a type of D2D communication, there is V2X (vehicle-to-everything) communication. V2X refers to communication technology through all interfaces with the vehicle. The implementation form of V2X may be as follows.

In V2X, 'X' may mean a person (Persian) or a pedestrian (PEDESTRIAN). In this case, V2X may be displayed as a vehicle-to-person or vehicle-to-pedestrian (V2P). Here, the pedestrian is not necessarily limited to a person who moves on foot, and may include a person riding a bicycle, a driver or a passenger of a vehicle (below a certain speed).

Alternatively, 'X' may be an infrastructure/network. In this case, V2X may be expressed as V2I (vehicle-to-infrastructure) or V2N (vehicle-to-network), and may mean communication between a vehicle and a roadside unit (ROADSIDE UNIT: RSU) or a vehicle and a network. The roadside device may be a device that informs traffic-related infrastructure, for example, a speed. The roadside device may be implemented in a base station or a fixed terminal.

Alternatively, 'X' in V2X may be a vehicle (VEHICLE). In this case, V2X may be expressed as vehicle-to-vehicle (V2V), and may mean communication between vehicles.

A wireless device mounted on a vehicle may be referred to as a V2V device or a V2X device.

Communication between V2X devices without going through a base station is called V2X communication, and a link used for communication between V2X devices is also called a sidelink.

FIG. 8 is an exemplary diagram illustrating the concept of V2X.

As can be seen with reference to FIG. 8, the wireless devices (ie, V2X devices) 100-1, 100-2, and 100-3 mounted on the vehicle may communicate with each other.

Figure 9:
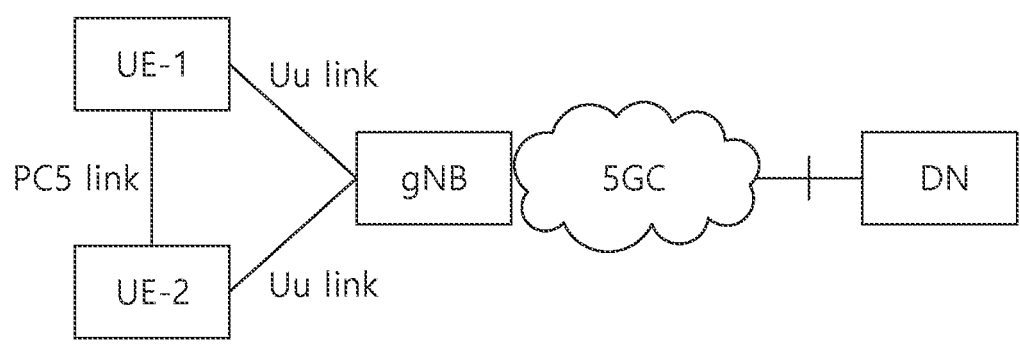
FIG. 9 shows an architecture for a ProSe service.

FIG. 9 shows an architecture for a ProSe service.

Referring to FIG. 9, UE-1 and UE-2 are respectively connected to a base station (gNB) through a Uu link. UE-1 and UE-2 can also communicate directly via the PC5 link.

Figure 10:
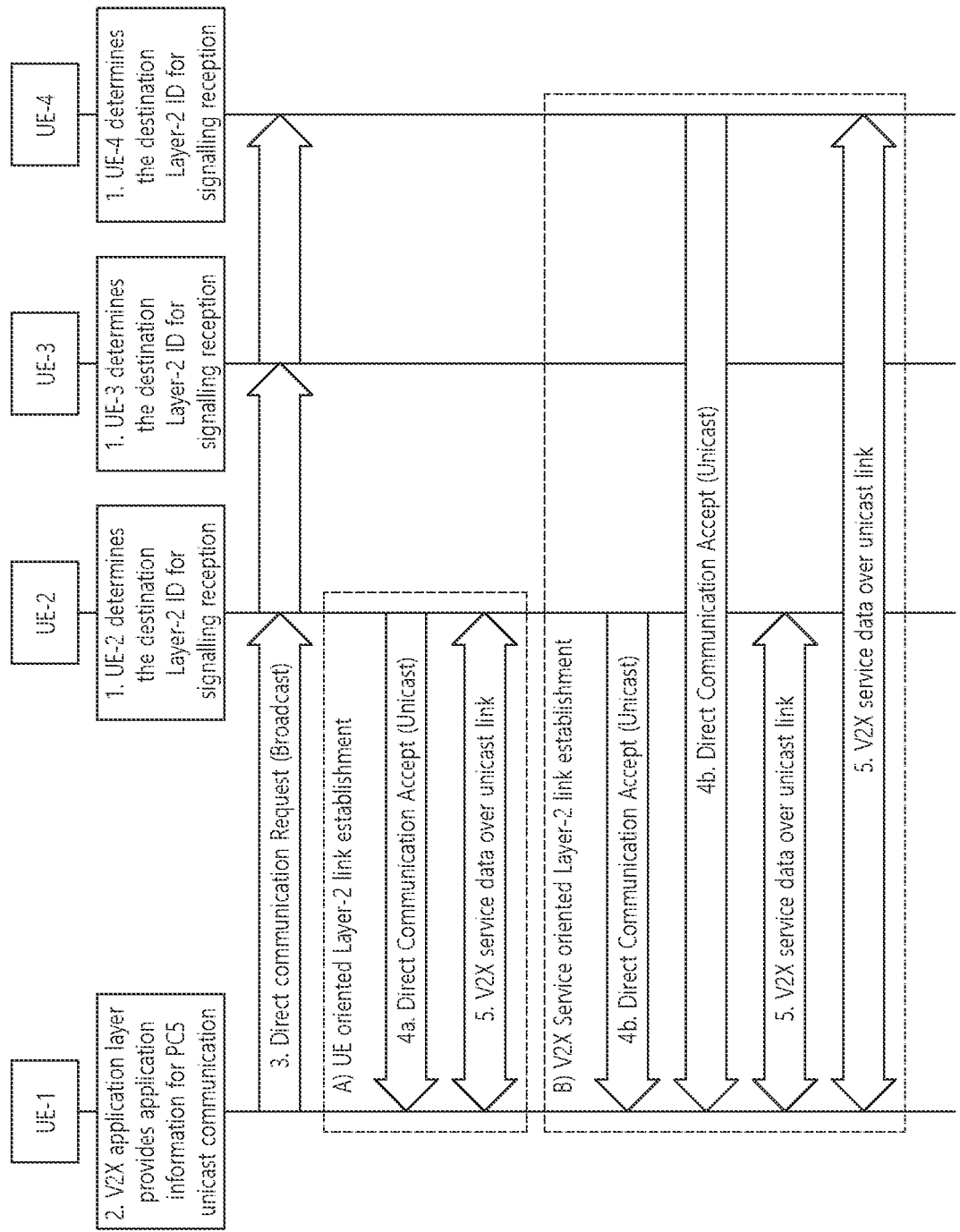
FIG. 10 is an exemplary signal flow diagram illustrating a second layer link establishment procedure.

FIG. 10 is an exemplary signal flow diagram illustrating a second layer link establishment procedure.

As shown in FIG. 10, in order to perform the unicast mode of V2X communication on the PC5 link, the UE may be configured with related information.

1) Each UE (ie, UE-1, UE-2, UE-3 and UE-4) may determine a destination second layer ID for signaling reception in order to establish a PC5 unicast link. The UE may be configured with the destination second layer ID.

2) The V2X application layer in UE-1 may provide application information for PC5 unicast communication. The application information may include a service type (eg, Provider Service Identifier (PSID) or Intelligent Transport Systems Application Identifier (ITS-AID)) of the V2X application and an application layer ID of the UE. The application information may further include an application layer ID of the target UE.

The V2X application layer in UE-1 may provide V2X application requirements for the unicast communication. UE-1 may determine a PC5 QoS parameter and a PC5 QoS Flow Identifier (PFI).

When UE-1 decides to reuse the existing PC5 unicast link, the UE-1 may trigger a second layer link modification procedure as described below.

3) The UE-1 transmits a direct communication request message to initiate a unicast layer 2 link establishment procedure. The direct communication request message may include the following information.

Source user information: the application layer ID of the UE (ie, the application ID of UE-1).
As the application layer ID of the target UE provided by the V2X application layer in process 2, it includes the following.
Target User Information: Application ID of the target UE (eg, Application Layer ID of UE-2).
V2X service information: information about the V2X service requesting establishment of a second layer link (eg, PSID or ITS-AID).
Indication of whether IP communication is used
IP address setting: For IP communication, IP address setting may be required for this link, and IP address setting may indicate one of the following values.
"IPv6 Router": if the IP version 6 address allocation mechanism is supported by the UE
"IPv6 address allocation not supported": when the IP version 6 address allocation mechanism is not supported by the UE
Link-local IPv6 address: If UE-1 does not support the IP version 6 address allocation mechanism, the link-local IP version 6 address may be used internally.
QoS Information: Information about PC5 QoS flow. For each PC5 QoS flow, the PFI and the corresponding PC5 QoS parameters (ie other parameters such as PQI and MFBR/GFBR).

The source second layer ID and the destination second layer ID to be used for transmitting the direct communication request message may be determined as described below.

UE-1 may send the communication request message directly via PC5 broadcast using the source 2nd layer ID and the destination 2nd layer ID.

4) A direct communication accept message is sent to UE-1.

4*a*. (When the UE establishes a second layer link) When the direct communication request message includes target user information, the target UE, that is, UE-2, transmits a direct communication accept message.

4*b*. (When the V2X service establishes a second layer link) When the direct communication request message does not include the target user information, in order to establish a second layer link with UE-1, UEs interested in using the V2X service (UE-2 and UE-4 in FIG. 10) respond to the request message by sending a direct communication accept message.

The direct communication acceptance message includes the following information.

Source user information: the application ID of the UE sending the direct communication accept message
QoS Information: Information about PC5 QoS flow. For each PC5 QoS flow, the PFI requested by UE-1 and the corresponding PC5 QoS parameters (ie other parameters such as PQI and MFBR/GFBR).
IP address setting: For IP communication, IP address setting may be required for this link, and IP address setting may indicate one of the following values.
"IPv6 Router": if the IP version 6 address allocation mechanism is supported by the target UE
"IPv6 address allocation not supported": when the IP version 6 address allocation mechanism is not supported by the target UE
Link-local IPv6 address: If the target UE does not support the IP version 6 address allocation mechanism, the link-local IP version 6 address may be used internally.

The source second layer ID to be used for transmitting the direct communication acceptance message may be determined as described below. The destination second layer ID may be set as the source second layer ID of the received direct communication request message.

Upon receiving the communication accept message directly from the counterpart UE, UE-1 may acquire the second layer ID of the counterpart UE for later communication, signaling and data traffic.

The V2X layer of the UE that has established the PC5 unicast link may deliver the PC5 link ID and PC5 unicast link related information allocated for the unicast link to the AS layer. The PC5 unicast link related information may include second layer ID information (ie, source second layer ID and destination second layer ID). This makes it possible for the AS layer to maintain PC5 unicast link related information along with the PC5 link ID.

5) V2X service data is transmitted on the established unicast link.

The PC5 link ID and PFI are delivered to the AS layer together with V2X service data.

UE-1 may transmit V2X service data using the Source Second Layer ID (ie, UE-1's Second Layer ID for the unicast link) and the Destination second layer ID (ie, second layer ID of the counterpart UE for the unicast link).

Figure 11:
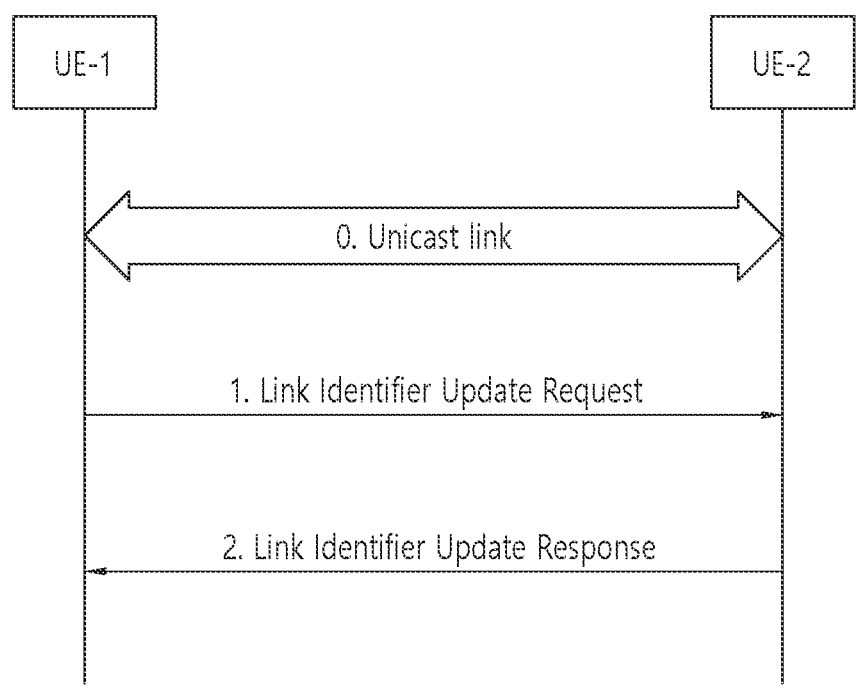
FIG. 11 is an exemplary signal flow diagram illustrating a procedure for updating a link ID for a unicast link.

FIG. 11 is an exemplary signal flow diagram illustrating a procedure for updating a link ID for a unicast link.

Due to privacy requirements, LDs (eg, application layer ID, source second layer ID, and IP address/prefix) used for the unicast mode of V2X communication on the PC5 link may change over time.

If the UE has multiple unicast links using the same application ID or second layer ID, the UE needs to perform a link ID update procedure on each unicast link.

0) It is assumed that UE-1 and UE-2 have a unicast link established through the procedure shown in FIG. 10.

1) UE-1 determines to change ID due to application link ID change or timer expiration, and transmits a link identifier update request message to UE-2.

The link identifier update request message may include new identifiers to be used (eg, a new application ID, a new second layer ID, and a new IP address/prefix). The new identifiers may be encrypted to ensure privacy.

2) UE-2 transmits a link identifier update response message.

Upon receiving the message, UE-1 and UE-2 start using the new identifier for data traffic. UE-1 receives traffic using its second layer ID until receiving a link identifier update response message from UE-2.

The V2X layer of each UE may deliver the PC5 link ID for the unicast link and the updated second layer ID (ie, the source second layer ID for UE-1 and the destination second layer ID for UE-2) passed to the AS layer.

This may cause the AS layer to update the provided second layer ID for the unicast link.

Figure 12:
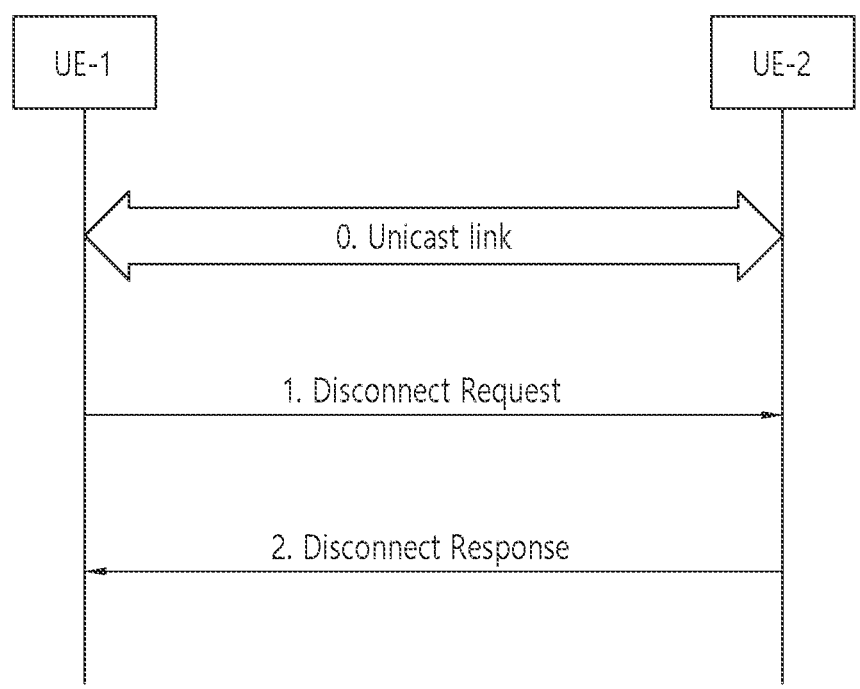
FIG. 12 is a signal flow diagram illustrating a procedure for releasing a second layer link on a PC5 link.

FIG. 12 is a signal flow diagram illustrating a procedure for releasing a second layer link on a PC5 link.

0) It is assumed that UE-1 and UE-2 have a unicast link established through the procedure shown in FIG. 10.

1) UE-1 may release a second layer link and transmit a Disconnect request message to UE-2 in order to delete all context data related to the second layer link.

2) Based on the reception of the disconnection request message, the UE-2 transmits a disconnection response message and deletes all context data related to the second layer link.

The V2X layer of each UE may inform the AS layer that the unicast link is released. This allows the AS layer to delete all contexts associated with the released unicast link.

Figure 13:
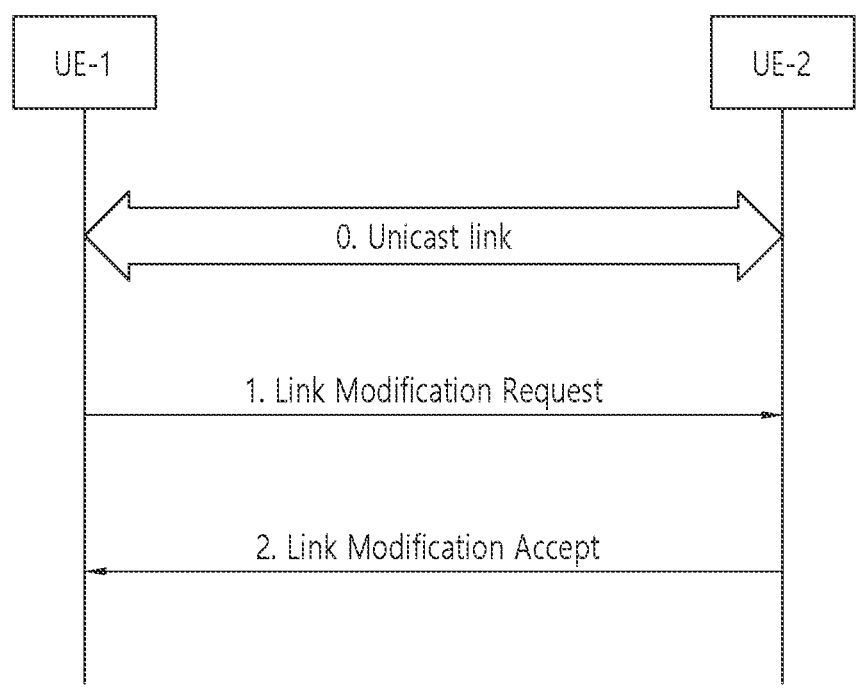
FIG. 13 is an exemplary signal flow diagram illustrating a second layer link modification procedure for a unicast link.

FIG. 13 is an exemplary signal flow diagram illustrating a second layer link modification procedure for a unicast link.

The second layer link modification procedure shown in FIG. 13 may be used in the following case.

When adding a new V2X service to the existing PC5 unicast link

When deleting any V2X service from the existing PC5 unicast link

When modifying any PC5 QoS flow on the existing PC5 unicast link

0) It is assumed that UE-1 and UE-2 have a unicast link established through the procedure shown in FIG. 10.

1) The V2X application layer in UE-1 may provide application information for PC5 unicast communication. The application information may include information about the service type of the V2X application (eg, PSID or ITS-AID) and the application layer ID of the UE. The application information may include an application ID of the target UE. If UE-1 decides to re-use the existing PC5 unicast link and to modify the unicast link established with UE-2, UE-1 may transmit a link modification request message to UE-2.

The link modification request message may include the following.

i) When Adding a New V2X Service to an Existing PC5 Unicast Link

V2X service information: information about the V2X service to be added (eg, PSID(s) or ITS-AID).

QoS information: Information on PC5 QoS flow for each V2X service to be added. For each PC5 QoS flow, the PFI and the corresponding PC5 QoS parameters (ie other parameters such as PQI and MFBR/GFBR etc.)

ii) In Case of Removing any V2X Service from the Existing PC5 Unicast Link

V2X service information: information about the V2X service to be removed (eg, PSID(s) or ITS-AID).

iii) When Modifying any V2X Service from the Existing PC5 Unicast Link

QoS information: Information on PC5 QoS flow for each V2X service to be modified. For each PC5 QoS flow, the PFI and the corresponding PC5 QoS parameters (ie other parameters such as PQI and MFBR/GFBR etc.)

2) UE-2 transmits a link modification accept message.

The link modification acceptance message may include the following items.

For I and iii in process 1

QoS information: Information on PC5 QoS flow for each V2X service to be modified. For each PC5 QoS flow, the PFI and the corresponding PC5 QoS parameters (ie other parameters such as PQI and MFBR/GFBR etc.)

The V2X layer of each UE may deliver information about the unicast link to the AS layer. This allows the AS layer to update the context associated with the modified unicast link.

<Disclosure of the Present Specification>

On the other hand, when the security policy is different between the requesting UE (or the initiating UE) (eg, UE-1) and the receiving UE (eg, UE-2), a problem may occur.

Disclosures of the present specification are intended to provide methods for solving the above-described problems.

I. First Disclosure

The first disclosure of the present specification presents a security policy in relation to the following reasons.

The following description presents methods for handling security policies from two UEs when the security policies of the two UEs are different from each other.

When two UEs each have their own security policies, there may be 9 possible cases as shown in the table below.

TABLE 3

| Case | UE transmitting request | receiving UE | Accept or reject the request | Activate or deactivate security |
|---|---|---|---|---|
| A) | REQUIRED | REQUIRED | Shall Accept | Activate |
| B) | REQUIRED | PREFERRED | Shall Accept | Activate |
| C) | REQUIRED | OFF | Shall Reject | N/A |
| D) | PREFERRED | REQUIRED | Shall Accept | Activate |
| E) | PREFERRED | PREFERRED | Shall Accept | Activate |
| F) | PREFERRED | OFF | Shall Accept | Deactivate |
| G) | OFF | REQUIRED | Shall Reject | N/A |
| H) | OFF | PREFERRED | Shall Accept | Deactivate |
| I) | OFF | OFF | Shall Accept | Deactivate |

The term "PREFEFFERED" means that security must be activated (or enabled). Furthermore, unless one of the two UEs is unable to provide security, the security should be activated.

The description below covers all cases.

When confidentiality/integrity in the received security policy is set to OFF and the policy of the receiving UE itself is set to "REQUIRED" or when confidentiality/integrity in the received security policy is set to "REQUIRED" and the policy of the receiving UE itself is set to "OFF", the receiving UE may reject the direct communication request or link modification request.

When confidentiality/integrity in the security policy for the received user plane is set to "OFF" and the policy of the receiving UE itself is set to "REQUIRED", or when confidentiality/integrity in the received user plane security policy is set to "REQUIRED" and the policy of the receiving UE itself is set to "OFF", the receiving UE may ignore Direct Security Mode Complete or reject the link modification request.

When confidentiality/integrity in the received security policy is set to "OFF" and the policy of the receiving UE itself is set to "PREFERRED", or when confidentiality/integrity in the received security policy is set to "PREFERRED" and the policy of the receiving UE itself is set to "OFF", or if both are set to "OFF", the receiving UE may accept a direct communication request or a link modification request.

When confidentiality/integrity in the received security policy is set to "OFF" and the policy of the receiving UE itself is set to "PREFERRED", or when confidentiality/integrity in the received security policy is set to "PREFERRED" and the policy of the receiving UE itself is set to "OFF" or when both are set to "OFF", the receiving UE may accept a direct communication request or a link modification request.

In another case, the receiving UE may accept a direct communication request, a direct security mode complete, or a link modification request, and may transmit a response message after activating security protection.

I-1. Security Policy

For the NR-based PC5 unicast mode, the UE may be provided with the following information.

A list of V2X services related to a geographic area, for example, a PSID or ITS-AID of a V2X application, and a security policy indicating the following information signaling integrity protection: REQUIRED/PREFERRED/OFF signaling confidentiality protection: REQUIRED/PREFERRED/OFF user plane integrity protection: REQUIRED/PREFERRED/OFF user plane confidentiality protection: REQUIRED/PREFERRED/OFF Note 1: Services that do not require security, such as emergency services, may not require integrity assurance for signaling.

When a non-NULL confidentiality or integrity algorithm is used to protect traffic, REQUIRED indicates that the UE can only accept the connection, on the other hand, OFF may mean that the UE uses a NULL confidentiality algorithm for signaling/user plane data or does not apply integrity protection. If the security policy is "PREFERRED", the UE may accept any algorithm for specific protection. The use of "PREFERRED" can make it possible to change the security policy without updating all UEs at once.

At the time of initial connection, the requesting UE (or initiating UE) may include information on its own signaling security policy in the direct communication request message. The receiving UE may consider the information when determining whether to accept the request. In addition, the receiving UE may consider the information when applying security in a Direct Security Mode Command message. Once the direct security mode command is received, the requesting UE (or initiating UE) may include information about its own user plane security policy in the direct security mode completion message. The receiving UE may consider the above information when determining whether to apply security in the following service data when deciding whether to accept the connection.

At the time of link modification to add new V2X service to the existing PC5 unicast link, if the signaling security policy of the new V2X service matches the security policy used for the Pc5 unicast link, a link modification request message including both the signaling security policy and the user plane security policy of the requesting UE (or initiating UE) may be transmitted to the receiving UE. Otherwise, the requesting UE (or initiating UE) may establish a separate PC5 link. The receiving UE may consider the information when determining whether to accept the request, and/or when determining whether to apply security in the link modification accept message.

Security policy processing on the receiving UE may be as follows.

When confidentiality/integrity in the received signaling security policy is set to "OFF", and the receiving UE's own related policy is set to "REQUIRED", or when the confidentiality/integrity in the received security policy is set to "REQUIRED" and the related policy of the receiving UE itself is set to "OFF", the receiving UE may reject the direct communication request message or the link modification request message.

When confidentiality/integrity in the received user plane security policy is set to "OFF" and the receiving UE's own related policy is set to "REQUIRED" or, when confidentiality/integrity in the received user plane security policy is set to "REQUIRED" and the receiving UE's own related policy is set to "OFF", the receiving UE may ignore the direct security mode completion message or reject the link modification request message.

When confidentiality/integrity in the signaling security policy is set to "OFF" and the receiving UE's own related policy is set to "PREFERRED" or when confidentiality/integrity in the signaling security policy is set to "PREFERRED" and the receiving UE's own related policy is set to "OFF", or if both are "OFF", the receiving UE may accept the direct communication request message or the link modification request message, and transmit a response message without security protection.

When confidentiality/integrity in the user plane security policy is set to "OFF" and the receiving UE's own related policy is set to "PREFERRED" or when confidentiality/integrity in the user plane security policy is set to "PREFERRED" and the receiving UE's own related policy is set to "OFF", or if both are "OFF, the receiving UE may accept the direct security mode completion message or the link modification request message, and transmit a response message without security protection.

Otherwise, the receiving UE may accept the direct communication request message, the direct security mode completion message, or the link modification request message, and may transmit the response message after activating the security protection.

I-2. Establishing Security for User Plane Bearers

At the time of initial connection or V2X service addition, the requesting UE (or initiating UE) may include its user plane security policy directly in the security mode completion message or link modification request message.

The receiving UE may directly process the security mode completion message or the link modification request message according to the security mode processing procedure.

The UE that initiates the establishment of the user plane bearer may select the LCID, a value that is not used for the current key, NRPEK and NRPIK, as the relevant value of the bearer for the input of the security algorithm. If this is not possible, the UE starts re-keying before establishing a user plane bearer.

When establishing the user plane bearer, the requesting UE (or initiating UE) may include the establishment of confidentiality and integrity protection in the RRC message on the PC5 link. The confidentiality and integrity protection algorithms may be the same as those selected for the protection of the signaling bearer.

Both UEs ensure that the user plane for each V2X service is transmitted or received on the bearer with the necessary security (eg, dropped if received with incorrect security on the bearer)

II. Second Disclosure

In the second disclosure, a security application policy management technique used when establishing a second layer (ie, L2) unicast link between two UEs for V2X described in the first disclosure will be described with reference to a signal flow diagram.

Figure 14:
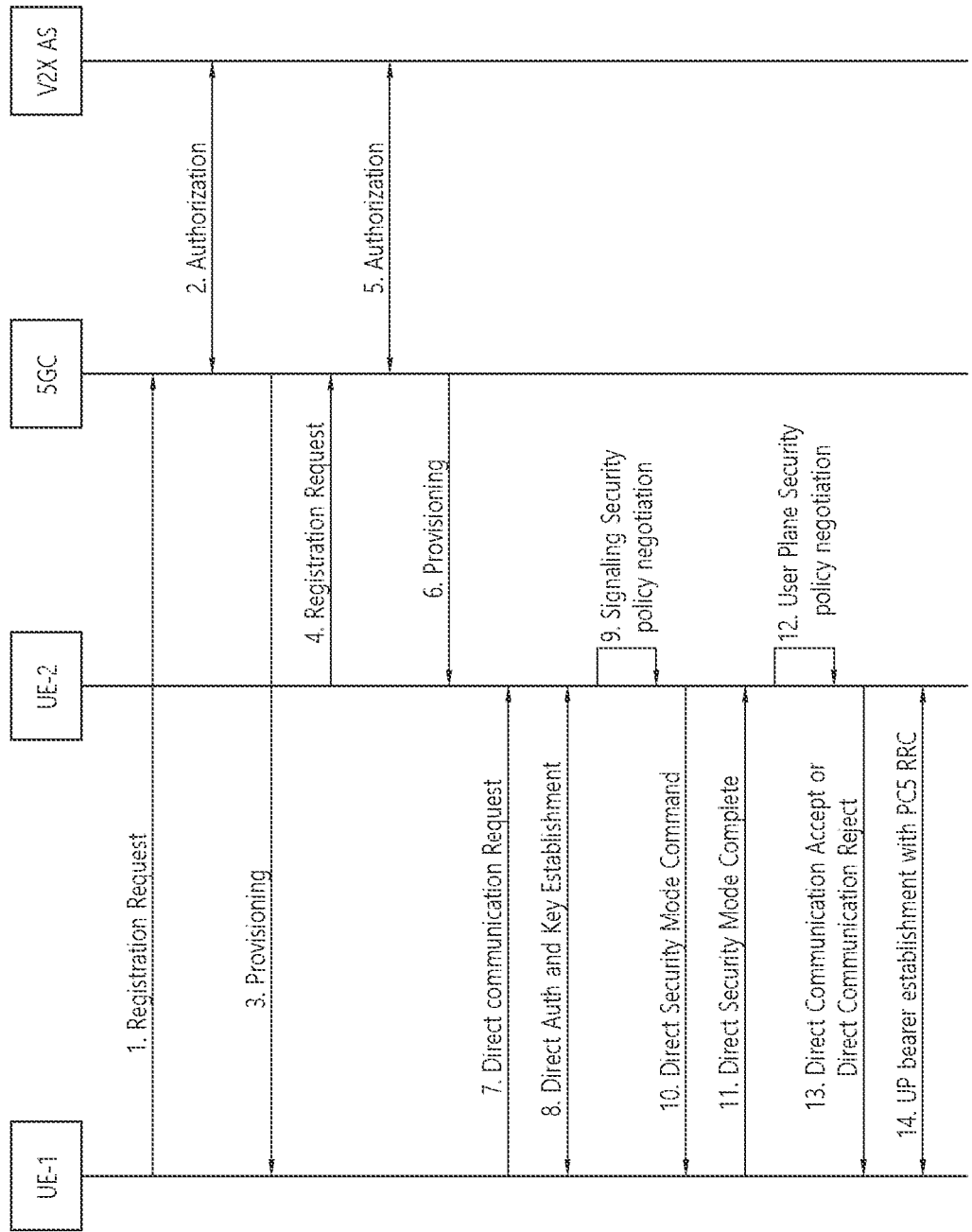
FIG. 14 is a signal flow diagram illustrating a security policy application procedure.

FIG. 14 is a signal flow diagram illustrating a security policy application procedure.

1) UE_1 includes the UE ID in the registration request message for device registration request and transmits it to 5GC (5G Core).

2) 5GC is authenticated whether UE_1 has the right to use the V2X unicast service through the AS (Application Server) that provides V2X service, and receives the necessary credentials for security and the security policy applied to the service.

3) 5GC completes the device registration procedure and provides UE_1 with credentials and security policy for V2X unicast link security setup acquired from V2X AS in addition to general information.

At this time, the security policy includes a signaling integrity security policy, a signaling confidentiality security policy, a user plane integrity security policy, and a user plane confidentiality security policy as described in the first disclosure.

4) UE_2 also includes the UE ID in the registration request message and transmits it to 5GC (5G Core).

5) 5GC authenticates whether UE_2 has the right to use the V2X unicast service through the AS (Application Server) that provides V2X service, and receives the necessary credentials for security and the security policy applied to the service.

6) 5GC completes the device registration procedure and provides UE_2 with credentials and security policy for V2X unicast link security setup acquired from V2X AS in addition to general information.

7) UE_1 transmits a direct communication request message to UE_2 according to the PC5 unicast signaling procedure. The request message includes a signaling (integrity, confidentiality) security policy.

8) UE_1 and UE_2 generate mutual authentication and encryption keys based on the credentials obtained in steps 3 and 6.

9) UE_2 checks the signaling security policy in the direct communication request message received from UE_1, and compares it with the signaling security policy stored in UE_2. The UE_2 determines a security function to be applied to the signaling message according to the comparison result as follows. In addition, the UE_2 determines whether to connect a signaling channel.

In the table below, if both Integrity and Confidentiality correspond to C and G, the UE-2 rejects the creation of a unicast channel by directly transmitting a communication rejection message to UE_1, proceeding to step 13 without performing a subsequent procedure.

TABLE 4

| | UE_1 Signaling Integrity Security Policy | UE_2 Signaling Integrity Security Policy | Whether signaling integrity security is applied and whether channel connection is in progress |
|---|---|---|---|
| A | Required | Required | Signaling channel connection with integrity security |
| B | Required | Preferred | Signaling channel connection with integrity security |
| C | Required | Off | Reject to create channel |
| D | Preferred | Required | Signaling channel connection with integrity security |
| E | Preferred | Preferred | Signaling channel connection with integrity security |
| F | Preferred | Off | Signaling channel connection without integrity security |
| G | Off | Required | Reject to create channel |
| H | Off | Preferred | Signaling channel connection without integrity security |
| I | Off | Off | Signaling channel connection without integrity security |

TABLE 5

| | UE_1 Signaling Confidentiality Security Policy | UE_2 Signaling Confidentiality Security Policy | Whether to apply signaling confidentiality security and whether to proceed with channel connection |
|---|---|---|---|
| A | Required | Required | Connecting signaling channel with confidentiality security applied |
| B | Required | Preferred | Connecting signaling channel with confidentiality security applied |
| C | Required | Off | Reject to create channel |
| D | Preferred | Required | Connecting signaling channel with confidentiality security applied |
| E | Preferred | Preferred | Connecting signaling channel with confidentiality security applied |
| F | Preferred | Off | Connecting signaling channel without confidentiality security applied |
| G | Off | Required | Reject to create channel |
| H | Off | Preferred | Connecting signaling channel without confidentiality security applied |
| I | Off | Off | Connecting signaling channel without confidentiality security applied |

10) According to the signaling security policy determined in step 9, UE_2 applies integrity/confidentiality security to the subsequent signaling message (eg Direct security mode command) (in the case of A, B, D, E) or does not apply it (in the case of F, H, I) and transmits it to UE_1. When applying security, UE_2 uses the key derived in step 8.

11) UE_1 security-verifies the received Direct security mode command message according to the agreed security policy, if there is no problem, UE_1 transmits a subsequent signaling message, Direct security mode complete message, to UE_2. The message includes information about the user plane integrity/secret security policy.

12) UE_2 checks the user plane security policy included in the Direct security mode complete message received from UE_1, and compares it with the user plane security policy stored in UE_2. The UE_2 determines a security function to be applied to a user plane message according to a comparison result as shown in a table to be described later, and determines whether to connect a signaling channel.

TABLE 6

| | UE_1 User Plane Integrity Security Policy | UE_2 User Plane Integrity Security Policy | Whether user plane integrity security is applied and whether channel connection is in progress |
|---|---|---|---|
| A | Required | Required | Signaling channel connection with integrity security |
| B | Required | Preferred | Signaling channel connection with integrity security |
| C | Required | Off | Reject to create channel |
| D | Preferred | Required | Signaling channel connection with integrity security |

TABLE 6-continued

| | UE_1 User Plane Integrity Security Policy | UE_2 User Plane Integrity Security Policy | Whether user plane integrity security is applied and whether channel connection is in progress |
|---|---|---|---|
| E | Preferred | Preferred | Signaling channel connection with integrity security |
| F | Preferred | Off | Signaling channel connection without integrity security |
| G | Off | Required | Reject to create channel |
| H | Off | Preferred | Signaling channel connection without integrity security |
| I | Off | Off | Signaling channel connection without integrity security |

TABLE 7

| | UE_1 User Plane Confidentiality Security Policy | UE_2 User Plane Confidentiality Security Policy | Whether user plane confidentiality security is applied and whether channel connection is in progress |
|---|---|---|---|
| A | Required | Required | Connecting signaling channel with confidentiality security applied |
| B | Required | Preferred | Connecting signaling channel with confidentiality security applied |
| C | Required | Off | Reject to create channel |
| D | Preferred | Required | Connecting signaling channel with confidentiality security applied |
| E | Preferred | Preferred | Connecting signaling channel with confidentiality security applied |
| F | Preferred | Off | Connecting signaling channel without confidentiality security applied |
| G | Off | Required | Reject to create channel |
| H | Off | Preferred | Connecting signaling channel without confidentiality security applied |
| I | Off | Off | Connecting signaling channel without confidentiality security applied |

13) In Tables 6 and 7, when integrity and confidentiality are both C and G, UE_2 sends a direct communication rejection message to UE_1 to reject unicast channel creation. However, in case of A, B, D, and E, UE_2 decides to apply integrity/secret security in future user plane communication between the two UEs and completes the signaling channel connection. However, in the case of F, H, and I, UE_2 decides not to apply integrity/secret security in future user plane communication between the two UEs, and completes the signaling channel connection.

14) Both UEs establish a user plane bearer through an RRC signal. In the user plane bearer setup process, security may be applied to conform to the user plane security policy determined in step 13 above.

III. Summary of the Disclosure of the Present Specification

In order to support direct communication between UEs in a mobile communication system, At the time of creating a secure link between the first UE and the second UE and at the time of modifying the link for adding a service, the security policies to be applied to signaling and user plane data may be exchanged, and the final application policy according to each policy combination can be determined.

When adding a new service to an existing link, the first UE may compare and determine whether the security policy for the new service is the same as the security policy applied to the existing link.

Hereinafter, an apparatus to which the above disclosure of the present specification can be applied will be described.

Figure 15:
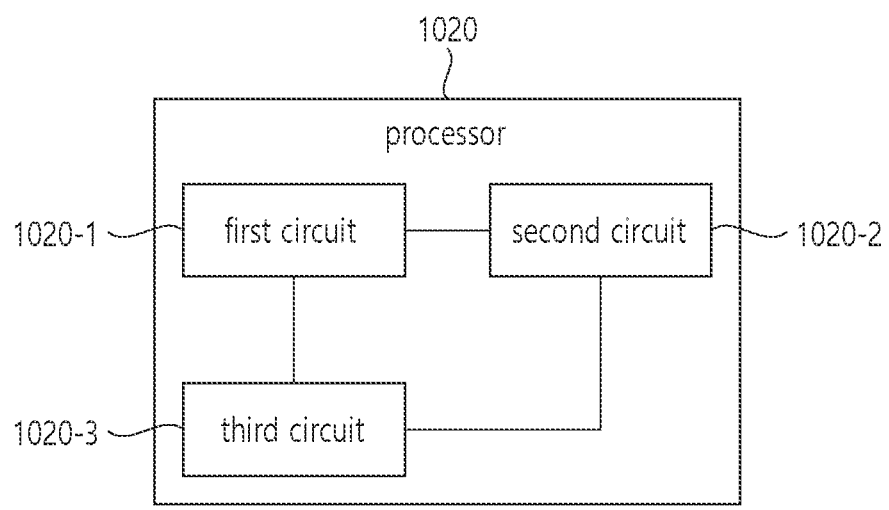
FIG. 15 shows a block diagram of a processor in which the disclosure of the present specification is implemented.

FIG. 15 shows a block diagram of a processor in which the disclosure of the present specification is implemented.

As can be seen with reference to FIG. 15, the processor 1020 on which the disclosure of this specification is implemented is configured to implement the proposed functions, procedures and/or methods described herein, it may include a plurality of circuitry. For example, the processor 1020 may include a first circuit 1020-1, a second circuit 1020-2, and a third circuit 1020-3. Also, although not shown, the processor 1020 may include more circuits. Each circuit may include a plurality of transistors.

The processor 1020 may be called an application-specific integrated circuit (A SIC) or an application processor (AP), and may include at least one of a digital signal processor (DSP), a central processing unit (CPU), and a graphics processing unit (GPU).

The processor may be mounted on a UE or a device for V2X.

The first circuit 1020-1 of the processor mounted in the device may receive a first message including first information on a security policy of the other device from the other device.

The first message may include a direct communication request message or a link modification request message.

The second circuit 1020-2 of the processor installed in the device may determine whether to accept or reject the first message, based on both the first information about the security policy of the other device and the second information about the security policy of the device.

The third circuit 1020-3 of the processor installed in the device may transmit a second message based on the determination.

The second message may include a direct communication rejection message or a link modification rejection message.

(i) based on the first information on the security policy of the other device being set as a first value and the second information on the security policy of the device as being set as the second value, the first message may be rejected The first message may be determined to be rejected based on that the first information on the security policy of the other device is different from the second information on the security policy of the device.

The second message may include a direct communication acceptance message or a link modification acceptance message.

(i) The first message may be determined to be accepted, based on that the first information on the security policy of the other device is set to the first value, and the second information on the security policy of the device is also set as the first value, (i) The first message may be determined to be accepted, based on that the first information on the security policy of the other device is set to a second value, and that the second information on the security policy of the device is also set as the second value.

The link modification request message may be received to add a new vehicle to everything (V2X) service to the PC5 unicast link.

The link modification request message may be received based on the security policy of the new V2X service being satisfied to be used for the PC5 unicast link.

Figure 16:
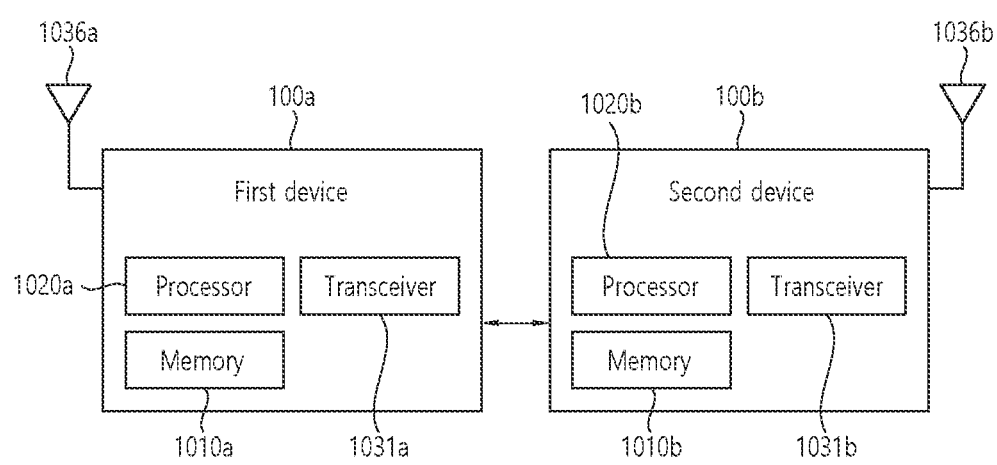
FIG. 16 illustrates a wireless communication system according to an embodiment.

FIG. 16 illustrates a wireless communication system according to an embodiment.

Referring to FIG. 16, the wireless communication system may include a first device 100a and a second device 100b.

The first device 100*a* may be a UE described in the disclosure of the present specification. Or, the first device 100*a* may be a base station, a network node, a transmission UE, a reception UE, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100*b* may be a network node (e.g. AMF or MME) described in the disclosure of the present specification. Or, the second device 100*b* may be a base station, a network node, a transmission UE, a reception UE, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE (100) may include a cellular phone, a smart phone, a laptop computer, a terminal for digital broadcasting, a Personal Digital Assistants (PDA), a Portable Multimedia Player (PMP), a navigation, a slate PC, a tablet PC, an ultrabook, a wearable device (e.g., a watch type terminal (smartwatch), a glass type terminal (smart glass), a Head Mounted Display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the objector background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or Point of Sales (PoS). For example, the climate/environment device may include a device for monitoring or predicting the climate/environment.

The first device 100*a* may include at least one processor such as a processor 1020*a*, at least one memory such as memory 1010*a*, and at least one transceiver such as a transceiver 1031*a*. The processor 1020*a* may perform the above-described functions, procedures, and/or methods. The processor 1020*a* may perform one or more protocols. For example, the processor 1020*a* may perform one or more layers of a radio interface protocol. The memory 1010*a* is connected to the processor 1020*a*, and may store various forms of information and/or instructions. The transceiver 1031*a* is connected to the processor 1020*a*, and may be controlled to transmit and receive radio signals.

The second device 100*b* may include at least one processor such as a processor 1020*b*, at least one memory device such as memory 1010*b*, and at least one transceiver such as a transceiver 1031*b*. The processor 1020*b* may perform the above-described functions, procedures and/or methods. The processor 1020*b* may implement one or more protocols. For example, the processor 1020*b* may implement one or more layers of a radio interface protocol. The memory 1010*b* is connected to the processor 1020*b*, and may store various forms of information and/or instructions. The transceiver 1031*b* is connected to the processor 1020*b* and may be controlled transmit and receive radio signals.

The memory 1010*a* and/or the memory 1010*b* may be connected inside or outside the processor 1020*a* and/or the processor 1020*b*, respectively, and may be connected to another processor through various technologies, such as a wired or wireless connection.

The first device 100*a* and/or the second device 100*b* may have one or more antennas. For example, an antenna 1036*a* and/or an antenna 1036*b* may be configured to transmit and receive radio signals.

Figure 17:
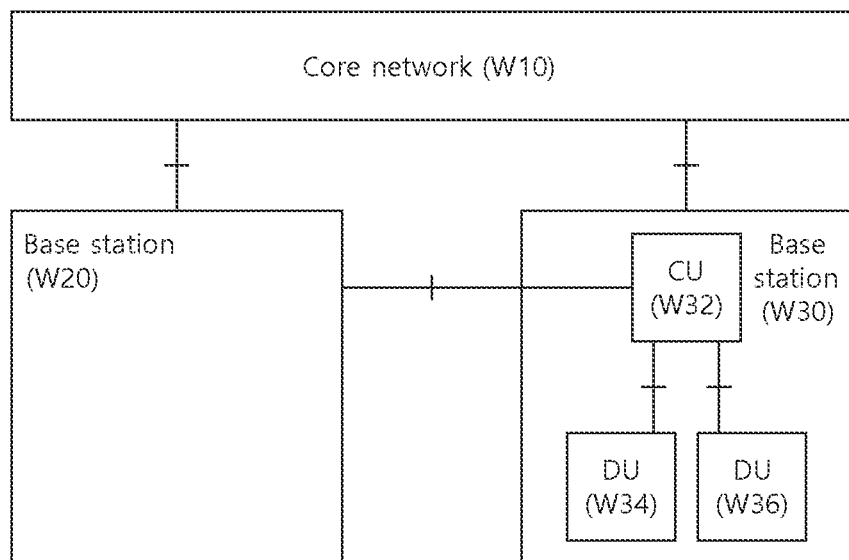
FIG. 17 illustrates a block diagram of a network node according to an embodiment.

FIG. 17 illustrates a block diagram of a network node according to an embodiment.

In particular, FIG. 17 is a diagram illustrating in detail a case in which a base station is divided into a Central Unit (CU) and a Distributed Unit (DU).

Referring to FIG. 17, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an FI. The CU W32 may perform a function of higher layers of the base station. The DU W34, W36 may perform a function of lower layers of the base station. For example, the CU W32 may be a logical node that hosts Radio Resource Control (RRC), Service Data Adaptation Protocol (SDAP) and Packet Data Convergence Protocol (PDCP) layers of the base station (e.g., gNB). The DU W34, W36 may be a logical node that hosts Radio Link Control (RLC), Media Access Control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 18:
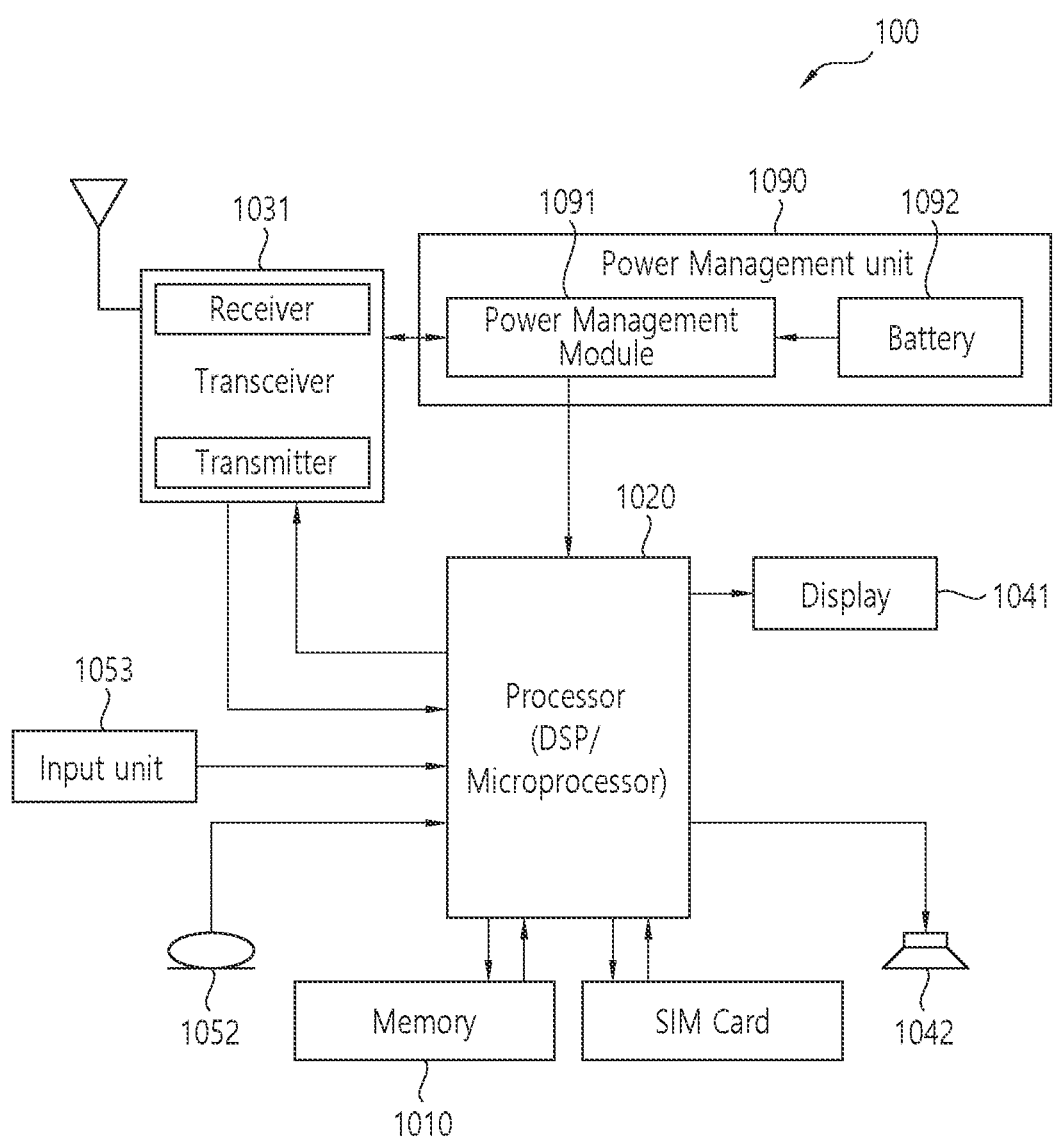
FIG. 18 is a block diagram illustrating the configuration of the UE 100 according to an embodiment.

FIG. 18 is a block diagram illustrating a configuration of a UE according to an embodiment.

In particular, the UE 100 shown in FIG. 18 is a diagram illustrating the first device of FIG. 16 in more detail.

A UE includes a memory 1010, a processor 1020, a transceiver 1031, a power management module 1091, a battery 1092, a display 1041, an input unit 1053, a speaker 1042, a microphone 1052, a Subscriber Identification Module (SIM) card, and one or more antennas.

The processor 1020 may be configured to implement the proposed function, process and/or method described in the present disclosure. Layers of a wireless interface protocol may be implemented in the processor 1020. The processor 1020 may include Application-Specific Integrated Circuit (ASIC), other chipset, logical circuit and/or data processing apparatus. The processor 1020 may be an Application Processor (AP). The processor 1020 may include at least one of a Digital Signal Processor (DSP), a Central Processing Unit (CPU), a Graphics Processing Unit (GPU) and a Modulator and Demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store International Mobile Subscriber Identity (IMSI) used for identifying a subscriber in a mobile telephoning apparatus such as a mobile phone and a computer and the related key. Many types of contact address information may be stored in the SIM card.

The memory 1010 is operably coupled with the processor 1020 and stores various types of information to operate the processor 1020. The memory may include Read-Only Memory (ROM), Random Access Memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is operably connected to the processor 1020 and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 19:
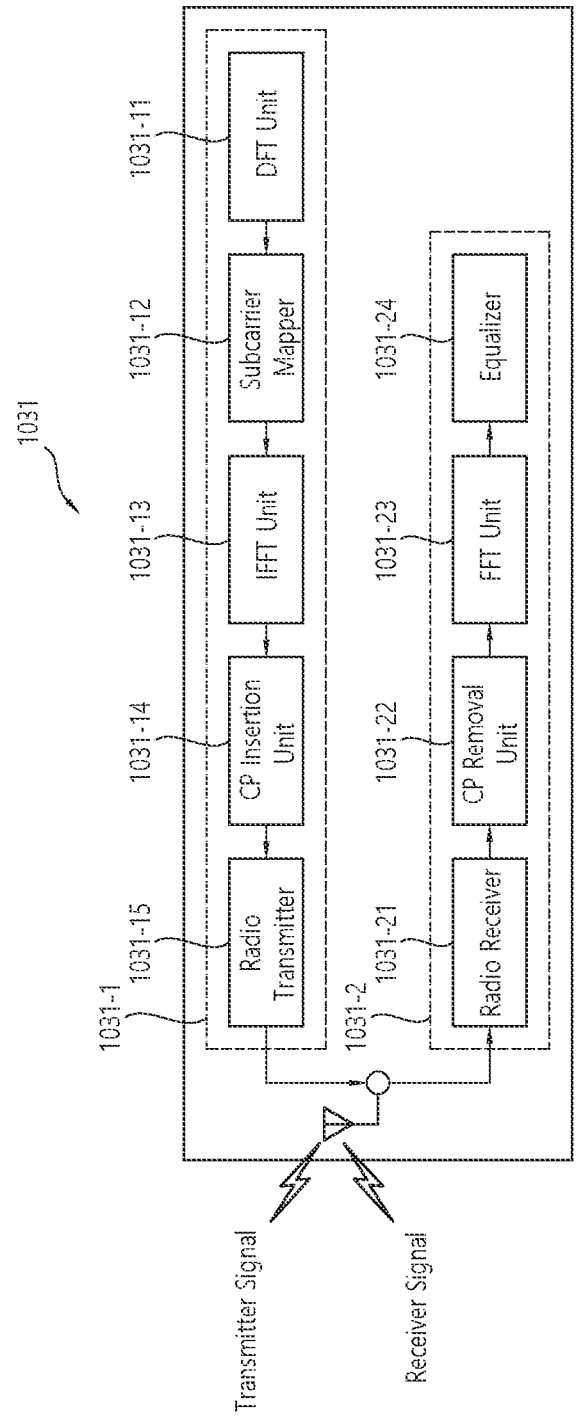
FIG. 19 is a detailed block diagram illustrating the transceiver of the first device shown in FIG. 16 or the transceiver of the device shown in FIG. 18.

FIG. 19 is a detailed block diagram illustrating the transceiver of the first device shown in FIG. 16 or the transceiver of the device shown in FIG. 18 in detail.

Referring to FIG. 19, the transceiver 1031 includes a transmitter 1031-1 and a receiver 1031-2. The transmitter 1031-1 includes a Discrete Fourier Transform (DFT) unit 1031-11, a subcarrier mapper 1031-12, an Inverse Fast Fourier Transform (IFFT) unit 1031-13 and a CP insertion unit 1031-14, and a radio transmitter 1031-15. The transmitter 1031-1 may further include a modulator. In addition, for example, a scramble unit (not shown), a modulation mapper (not shown), a layer mapper (not shown) and a layer permutator (not shown) may be further included and may be disposed before the DFT unit 1031-11. That is, in order to prevent an increase in the Peak-to-Average Power Ratio (PAPR), the transmitter 1031-1 passes information through the DFT 1031-11 before mapping a signal to a subcarrier. After subcarrier mapping, by the subcarrier mapper 1031-12, of the signal spread (or precoded in the same sense) by the DFT unit 1031-11, a signal on the time axis is made through the IFFT unit 1031-13.

The DFT unit 1031-11 outputs complex-valued symbols by performing DFT on input symbols. For example, when Ntx symbols are input (Ntx is a natural number), the DFT size is Ntx. The DFT unit 1031-11 may be referred to as a transform precoder. The subcarrier mapper 1031-12 maps the complex symbols to each subcarrier in the frequency domain. The complex symbols may be mapped to resource elements corresponding to resource blocks allocated for data transmission. The subcarrier mapper 1031-12 may be referred to as a resource element mapper. The IFFT unit 1031-13 outputs a baseband signal for data that is a time domain signal by performing IFFT on an input symbol. The CP insertion unit 1031-14 copies a part of the rear part of the baseband signal for data and inserts it in the front part of the baseband signal for data. Inter-Symbol Interference (ISI) and Inter-Carrier Interference (ICI) are prevented through CP insertion, so that orthogonality can be maintained even in a multi-path channel.

On the other hand, the receiver 1031-2 includes a radio receiver 1031-21, a CP remover 1031-22, an FFT unit 1031-23, and an equalizer 1031-24, etc. The radio receiver 1031-21, the CP removing unit 1031-22, and the FFT unit 1031-23 of the receiver 1031-2 performs the reverse function of the radio transmitter 1031-15, the CP insertion unit 1031-14 and the IFFT unit 1031-13 of the transmitter 1031-1. The receiver 1031-2 may further include a demodulator.

<Scenario to which the Disclosure of the Present Specification can be Applied>

Although not limited thereto, the various descriptions, functions, procedures, suggestions, methods, and/or flow charts of the disclosure of the present specification disclosed herein may be applied to various fields requiring wireless communication/connection (eg, 5G) between devices.

Hereinafter, it will be exemplified in more detail with reference to the drawings. In the following drawings/descriptions, the same reference numerals may exemplify the same or corresponding hardware blocks, software blocks, or functional blocks, unless otherwise indicated.

Figure 20:
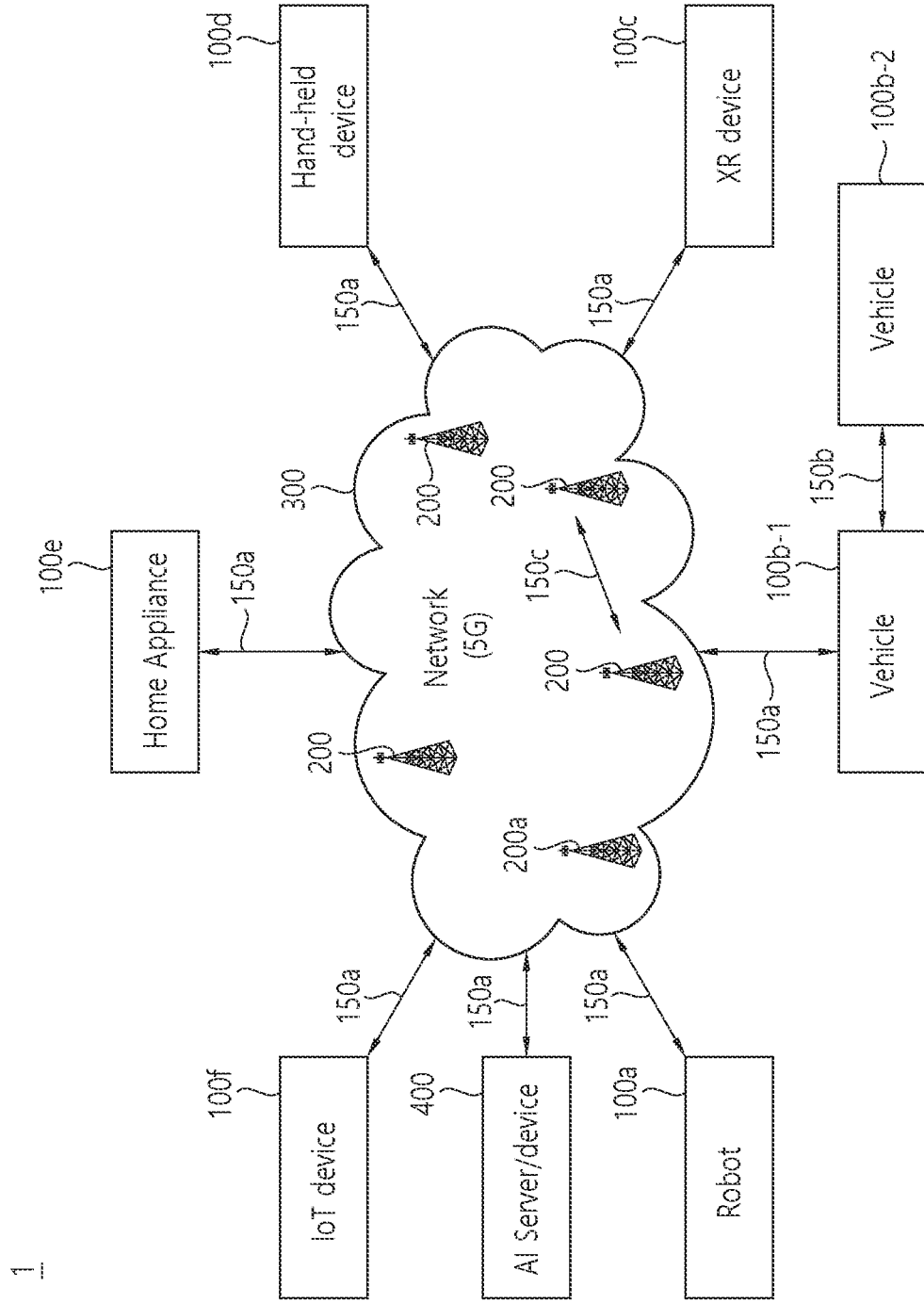
FIG. 20 illustrates a communication system 1 applied to the disclosure of the present specification.

FIG. 20 illustrates a communication system 1 applied to the disclosure of the present specification.

Referring to FIG. 20, the communication system 1 applied to the disclosure of the present specification includes a wireless device, a base station, and a network. Here, the wireless device refers to a device that performs communication using a radio access technology (e.g., 5G New RAT (NR)), Long-Term Evolution (LTE)), and may be referred to as a communication/wireless/5G device. Although not limited thereto, the wireless device may include a robot 100a, a vehicle 100b-1, 100b-2, an eXtended Reality (XR) device 100c, a hand-held device 100d, and a home appliance 100e, an Internet-of-Things (IoT) device 100f, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include Augmented Reality (AR)/Virtual Reality (VR)/Mixed Reality (MR) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The hand-held device may include a smartphone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200a may operate as a base station/network node to other wireless devices.

The wireless devices 100a to 100f may be connected to the network 300 via the base station 200. An Artificial Intelligence (AI) technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the base stations 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-Everything (V2X) communication). The IoT device (e.g., a sensor) may perform direct communication with other IoT devices (e.g., sensors) or other wireless devices 100a to 100f.

Wireless communication/connections 150a, 150b and 150c may be established between wireless device 100a to 100f and base station 200, between base station 200/base station 200. Herein, the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (IAB)), etc. The wireless devices 100a to 100f and the base station 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

In the above, preferred embodiments have been exemplarily described, but the disclosure of the present specification is not limited to such specific embodiments. Therefore, the disclosure of the present specification may be modified, changed, or improved in various forms within the present specification and the scope set forth in the claims.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim of the present specification may be combined to be implemented as an apparatus, and the technical features of the method claim of the present specification and the technical features of the apparatus claim of the present specification may be combined and implemented as a method.

What is claimed is:

1. A security policy handling method performed by a User Equipment (UE), the method comprising:
    receiving, from an initiating UE, a first message for a PC5 unicast link between the initiating UE and the UE, wherein the first message includes a security policy of the initiating UE, and the first message is a direct communication request message or a link modification request message, determining whether to accept or reject the first message, based on both the security policy of the initiating UE and a security policy of the UE, wherein the security policy of the initiating UE relates to activating or deactivating a security for the PC5 unicast link, and wherein whether to accept or reject the first message is determined based on comparing the security policy of the initiating UE and a security policy of the UE; and transmitting a second message, based on the determination.

2. The method of claim 1,
wherein the second message is a direct communication reject message or a link modification reject message.

3. The method of claim 2,
wherein the first message is determined to be rejected, based on (i) that the security policy of the initiating UE is set to a first value and (ii) that the security policy of the UE is set to a second value.

4. The method of claim 2,
wherein the first message is determined to be rejected, based on that the security policy of the initiating UE is different from the security policy of the UE.

5. The method of claim 1,
wherein the second message is a direct communication accept message or a link modification accept message.

6. The method of claim 5,
wherein the first message is determined to be accepted, based on (i) that the security policy of the initiating UE is set to a first value and (ii) that the security policy of the UE is set to the first value.

7. The method of claim 5,
wherein the first message is determined to be accepted, based on (i) that the security policy of the initiating UE is set to a second value and (ii) that the security policy of the UE is set to the second value.

8. The method of claim 1,
wherein the link modification request message is received for adding a new vehicle to everything (V2X) service to an PC5 unicast link.

9. The method of claim 8,
wherein the link modification request message is received based on that security policy of the new V2X service is satisfied in use for the PC5 unicast link.

10. A User Equipment (UE) comprising:
at least one processor; and
at least one memory for storing instructions and operably electrically connectable with the at least one processor, wherein the instructions are executed based on execution by the at least one processors, to perform operations include:

receiving, from an initiating UE, a first message for a PC5 unicast link between the initiating UE and the UE, wherein the first message includes a security policy of the initiating UE, and the first message is a direct communication request message or a link modification request message, determining whether to accept or reject the first message, based on both the security policy of the initiating UE and a security policy of the UE, wherein the security policy of the initiating UE relates to activating or deactivating a security for the PC5 unicast link, and wherein whether to accept or reject the first message is determined based on comparing the security policy of the initiating UE and a security policy of the UE; and transmitting a second message, based on the determination.

11. The UE of claim 10,
wherein the second message is a direct communication reject message or a link modification reject message.

12. The UE of claim 11,
wherein the first message is determined to be rejected, based on (i) that the security policy of the initiating UE is set to a first value and (ii) that the security policy of the UE is set to a second value.

13. The UE of claim 11,
wherein the first message is determined to be rejected, based on that the security policy of the initiating UE is different from the security policy of the UE.

14. The UE of claim 10,
wherein the second message is a direct communication accept message or a link modification accept message.

15. The UE of claim 14,
wherein the first message is determined to be accepted, based on (i) that the security policy of the initiating UE is set to a first value and (ii) that the security policy of the UE is set to the first value.

16. The UE of claim 14,
wherein the first message is determined to be accepted, based on (i) that the security policy of the initiating UE is set to a second value and (ii) that the security policy of the UE is set to the second value.

17. A security policy handling method performed by a initiating User Equipment (UE), the method comprising:
transmitting, to a UE, a first message for a PC5 unicast link between the initiating UE and the UE, wherein the first message includes a security policy of the initiating UE, and the first message is a direct communication request message or a link modification request message; and receiving a second message from the UE, wherein the second message is transmitted by the UE, based on that the UE determines whether to accept or reject the first message, based on both the security policy of the initiating UE and a security policy of the UE, wherein the security policy of the initiating UE relates to activating or deactivating a security for the PC5 unicast link, and wherein whether to accept or reject the first message is determined based on comparing the security policy of the initiating UE and a security policy of the UE.

18. The method of claim 17,
wherein the second message is a direct communication reject message or a link modification reject message.

19. The method of claim 17,
wherein the second message is a direct communication accept message or a link modification accept message.

* * * * *